(12) United States Patent
Kim et al.

(10) Patent No.: US 9,678,705 B2
(45) Date of Patent: Jun. 13, 2017

(54) DISPLAYING INFORMATION ON WEARABLE DEVICES

(71) Applicant: Samsung Electronics Co., Ltd., Gyeonggi-do (KR)

(72) Inventors: Moon-Soo Kim, Seoul (KR); Kwang-Tai Kim, Gyeonggi-do (KR); Da-Som Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 170 days.

(21) Appl. No.: 14/539,079

(22) Filed: Nov. 12, 2014

(65) Prior Publication Data
US 2015/0130685 A1 May 14, 2015

(30) Foreign Application Priority Data
Nov. 12, 2013 (KR) .................. 10-2013-0136818

(51) Int. Cl.
*G06F 3/14* (2006.01)
*G06F 3/147* (2006.01)

(52) U.S. Cl.
CPC ............ *G06F 3/147* (2013.01); *G06F 3/1454* (2013.01); *G09G 2320/028* (2013.01); *G09G 2340/0492* (2013.01); *G09G 2356/00* (2013.01)

(58) Field of Classification Search
CPC .................................. G06F 3/012; G06F 3/013
See application file for complete search history.

(56) References Cited

U.S. PATENT DOCUMENTS

| | | | | |
|---|---|---|---|---|
| 2009/0174946 A1* | 7/2009 | Raviv | ................ | G02B 27/0176 359/632 |
| 2013/0147686 A1* | 6/2013 | Clavin | .................... | G06F 3/013 345/8 |
| 2013/0321390 A1* | 12/2013 | Latta | ....................... | G06T 11/00 345/419 |
| 2014/0071288 A1* | 3/2014 | Kim | ................... | H04N 5/23293 348/158 |
| 2014/0168271 A1* | 6/2014 | Yu | .......................... | G06F 3/012 345/652 |
| 2015/0015459 A1* | 1/2015 | Cho | ...................... | G02B 27/017 345/8 |

FOREIGN PATENT DOCUMENTS

| | | |
|---|---|---|
| KR | 10-2011-0093464 A | 8/2011 |
| KR | 10-2013-0006154 A | 1/2013 |

* cited by examiner

Primary Examiner — Dorothy Harris
(74) Attorney, Agent, or Firm — Cha & Reiter, LLC

(57) ABSTRACT

A method in an electronic device is provided including establishing a communication with a wearable device and transmitting a first data item from the electronic device to the wearable device based on (i) a distance between the electronic device and the wearable device and (ii) a position of the wearable device relative to the electronic device.

16 Claims, 31 Drawing Sheets

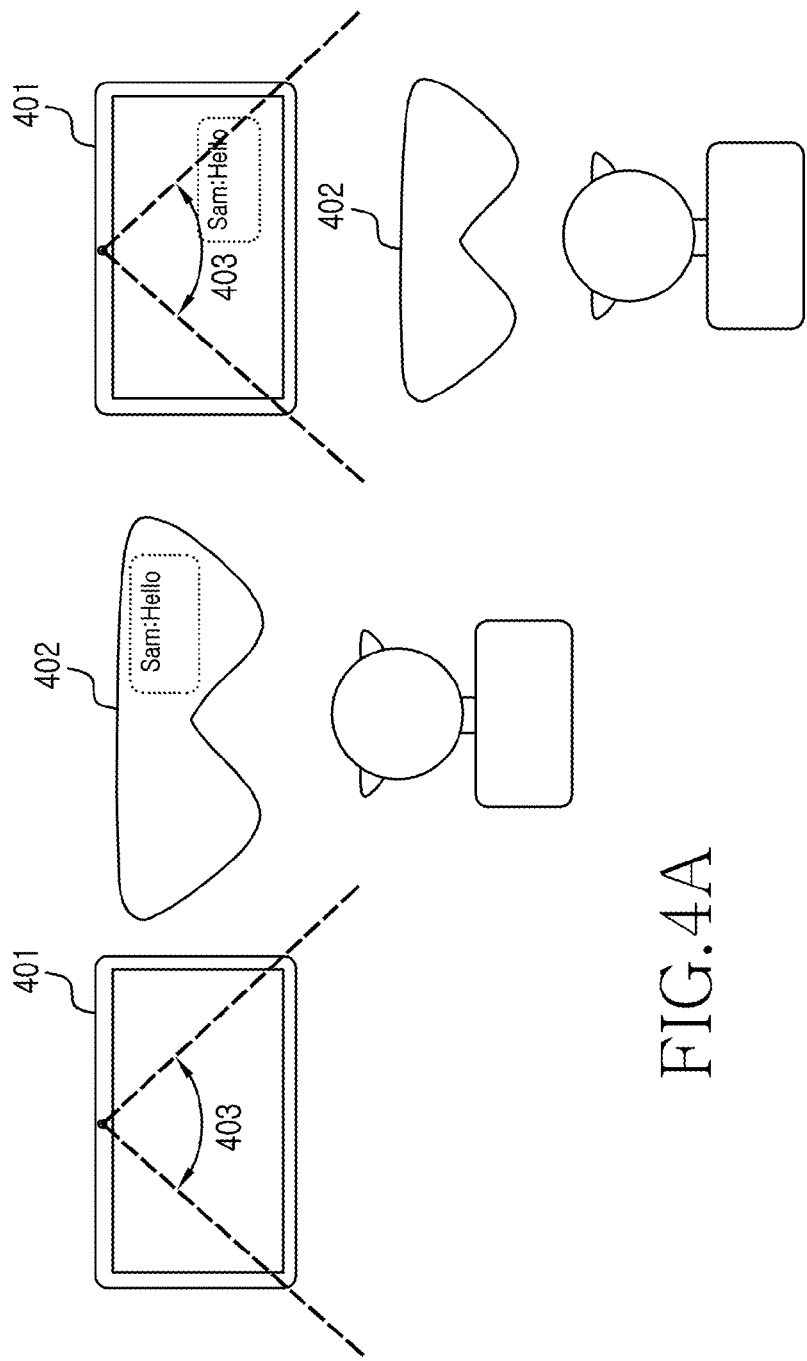

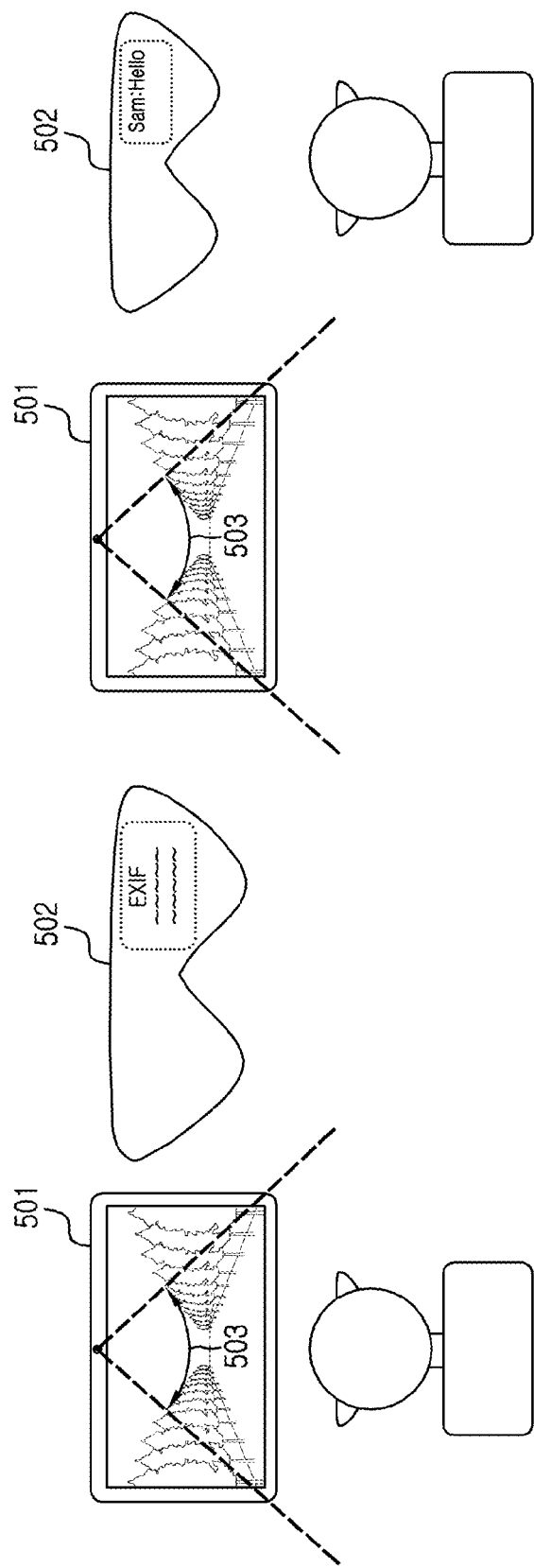

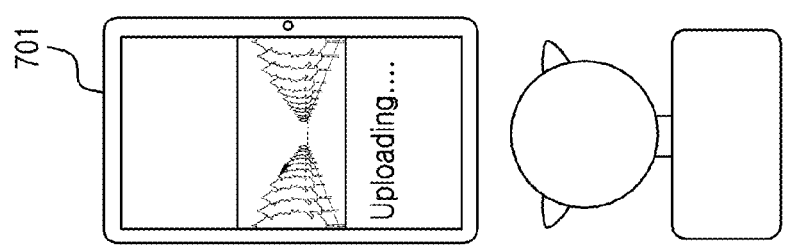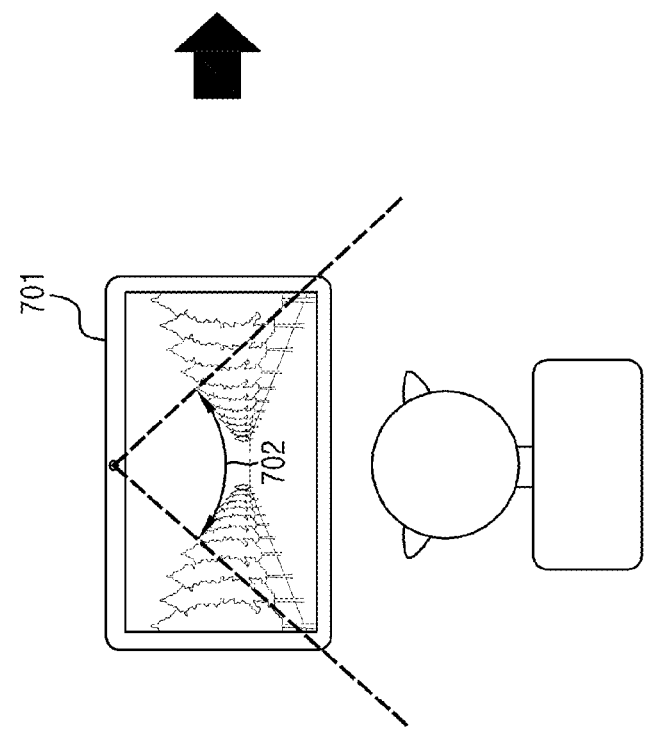

DISPLAYING INFORMATION ON WEARABLE DEVICES

CLAIM OF PRIORITY

The present application claims the benefit under 35 U.S.C. §119(a) to a Korean patent application filed in the Korean Intellectual Property Office on Nov. 12, 2013, and assigned Serial No. 10-2013-0136818, the entire disclosure of which is hereby incorporated by reference.

TECHNICAL FIELD

The present disclosure relates generally to an electronic device and a method for display of information on wearable devices.

BACKGROUND

Wearable devices, such as head-mounted displays are capable of interfacing with other non-wearable devices, such as smartphones, to augment and enhance various functionalities offered by the non-wearable devices. However, at present, the number of ways in which wearable devices can be integrated with non-wearable devices is limited. Accordingly, the need exists for new techniques for operating wearable devices in conjunction with non-wearable devices.

SUMMARY

The present disclosure addresses this need. According to one aspect of the disclosure, a method in an electronic device is provided including establishing a connection between an electronic device and a wearable device; transmitting a first data item from the electronic device to the wearable device based on (i) a distance between the electronic device and the wearable device and (ii) a position of the wearable device relative to the electronic device.

According to another aspect of the disclosure, an electronic device comprising a processor configured to: establishing a connection with a wearable device; transmitting a first data item to the wearable device based on (i) a distance between the electronic device and the wearable device and (ii) a position of the wearable device relative to the electronic device.

According to another aspect of the present disclosure, a method for operating an electronic device includes determining whether the wearable electronic device is placed in preset distance and angle range; and when the wearable electronic device is placed in the preset distance and angle range, determining according to a type of information to display whether to send information data to the wearable electronic device.

According to another aspect of the present disclosure, a method for operating an electronic device linked to a wearable electronic device, includes determining whether the wearable electronic device is placed in preset distance and angle range; and when the wearable electronic device is placed in the preset distance and angle range, receiving content information captured by the wearable electronic device.

According to another aspect of the present disclosure, an electronic device linked to a wearable electronic device, includes a processor for determining whether the wearable electronic device is placed in preset distance and angle range, and when the wearable electronic device is placed in the preset distance and angle range, determining according to a type of information to display whether to send information data to the wearable electronic device; and a memory for storing data controlled by the processor.

According to another aspect of the present disclosure, an electronic device linked to a wearable electronic device, includes a processor for determining whether the wearable electronic device is placed in preset distance and angle range; and a communication module for, when the wearable electronic device is placed in the preset distance and angle range, receiving content information captured by the wearable electronic device.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features, and advantages of the present disclosure will be more apparent from the following description taken in conjunction with the accompanying drawings, in which:

FIG. 4A and FIG. 4B are diagrams illustrating an example of a process for displaying information on wearable devices, according to aspects of the disclosure;

FIG. 5A and FIG. 5B are diagrams illustrating an example of a process for displaying information on wearable devices, according to aspects of the disclosure;

FIG. 7A and FIG. 7B are diagrams illustrating an example of a process for displaying information on wearable devices, according to aspects of the disclosure;

Throughout the drawings, like reference numerals will be understood to refer to like parts, components and structures.

DETAILED DESCRIPTION

Figure 1:
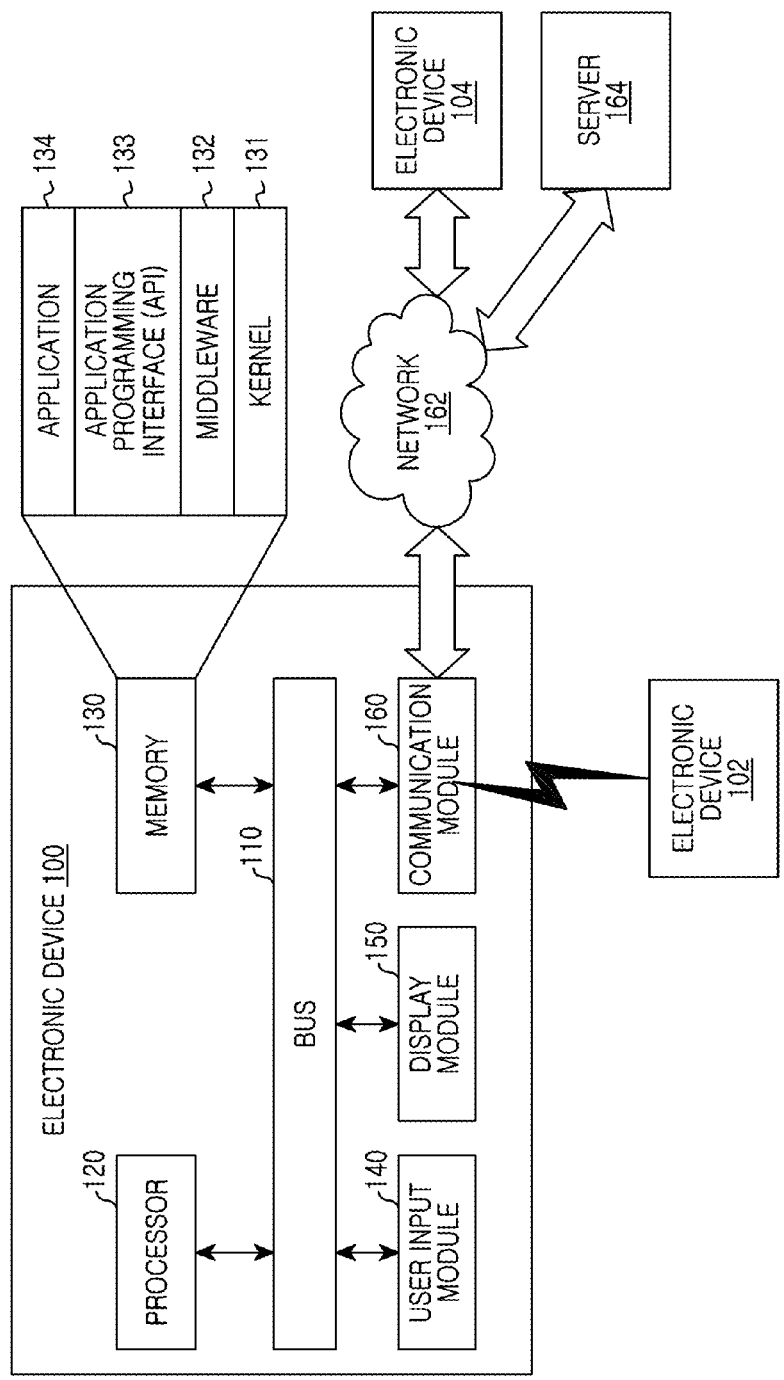
FIG. 1 is a block diagram of an example of an electronic device according to aspects of the disclosure.

The following description with reference to the accompanying drawings is provided to assist in a comprehensive understanding of aspects of the disclosure as defined by the claims and their equivalents. It includes various specific details to assist in that understanding but these are to be regarded as merely exemplary. Accordingly, those of ordinary skill in the art will recognize that various changes and modifications of the examples described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used to enable a clear and consistent understanding of the disclosure. Accordingly, it should be apparent to those skilled in the art that the following description of aspects of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, "a component surface" may reference one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide and can be determined without undue experimentation.

A wearable electronic device, according to aspect of the disclosure may connect to another electronic device (e.g., smart phone), and may communicate data between the wearable electronic device and the other electronic device. The wearable electronic device, according to aspects of the disclosure may include a head-mounted display unit, a smart watch, a glass type device and/or any other suitable type of device. An electronic device according to aspects of the disclosure can include a device having a communication function. For example, the electronic device can include one or more combinations of various devices including a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical appliance, an electronic bracelet, an electronic necklace, an electronic accessory, a camera, a wearable device, an electronic clock, a wrist watch, a smart white appliance (e.g., refrigerator, air conditioner, vacuum cleaner, artificial intelligence robot, television (TV), Digital Versatile Disc (DVD) player, audio system, oven, microwave oven, washing machine, air purifier, digital frame), medical appliances (e.g., Magnetic Resonance Angiography (MRA), Magnetic Resonance Imaging (MRI), Computed Tomography (CT), X-ray, ultrasonicator)), a navigation device, a Global Positioning System (GPS) receiver, an Event Data Recorder (EDR), a Flight Data Recorder (FDR), a set-top box, a TV box (e.g., Samsung HomeSync™ AppleTV™, Google TV™), an electronic dictionary, a in-vehicle infotainment, electronic equipment for ship (e.g., marine navigation device, gyro compass), avionics, a security device, an e-textile, a digital key, a camcorder, a game console, a Head Mounted Display (HMD), a flat panel display device, an electronic album, part of furniture or building/structure having the communication function, an electronic board, an electronic sign input device, and a projector. However, it is to be understood that the meaning of the term "electronic device" is not limited to those devices.

FIG. 1 is a block diagram of an example of an electronic device according to aspects of the disclosure. Referring to FIG. 1, the electronic device 100 can include a bus 110, a processor 120, a memory 130, a user input module 140, a display module 150, and a communication module 160.

The bus 110 can be a circuit for interlinking the above-stated components and transferring communication (e.g., control messages) between the components.

The processor 120 can include any suitable type of electronic circuitry, such as a general-purpose processor (e.g., an ARM-based processor, a MIPS-based processor, an x86-based processor, etc.), a Field Programmable Gate Array (FPGA), or an Application-Specific Integrated Circuit (ASIC). The processor 120 can receive an instruction from the components (e.g., the memory 130, the user input module 140, the display module 150, and the communication module 160) via the bus 110, interpret the received instruction, and perform an operation or a data processing according to the interpreted instruction.

The memory 130 may include any suitable type of volatile memory, non-volatile memory, and/or remote storage. The memory 130 can store the instruction or the data received from or generated by the processor 120 or the other components (e.g., the user input module 140, the display module 150, and the communication module 160). For example, the memory 130 can include programming modules including a kernel 131, middleware 132, an Application Programming Interface (API) 133, and an application 134. The programming modules can be implemented using software, firmware, and hardware, or a combination of at least two of them.

The kernel 131 can control or manage system resources (e.g., the bus 110, the processor 120, or the memory 130) used to execute the operation or the function of other programming modules, for example, the middle ware 132, the API 133, and the application 134. The kernel 131 can provide an interface allowing the middleware 132, the API 133, or the application 134 to access and control or manage the individual component of the electronic device 100.

The middleware 132 can relay data between the API 133 or the application 134 and the kernel 131. The middleware 132 can perform load balancing for work requests received from the applications 134 by giving priority of the system resource (e.g., the bus 110, the processor 120, or the memory 130) of the electronic device 100 to at least one of the applications 134.

The API 133, which is an interface for the application 134 to control the kernel 131 or the middleware 132, can include at least one interface or function for file control, window control, image processing, or text control.

The user input module 140 can receive and forward the instruction or the data from the user to the processor 120 or the memory 130 via the bus 110. The display module 150 can display an image, a video, or data to the user.

The communication module 160 can connect the communication between other electronic devices 102 and the electronic device 100. The communication module 160 can support short-range communication protocol (e.g., Wireless Fidelity (Wi-Fi), Bluetooth (BT), Near Field Communication (NFC)), or communication network 162 (e.g., Internet, Local Area Network (LAN), Wide Area Network (WAN), telecommunication network, cellular network, satellite network, or Plain Old Telephone Service (POTS)). The electronic devices 102 and 104 can be the same as or different from the electronic device 100.

Figure 2:
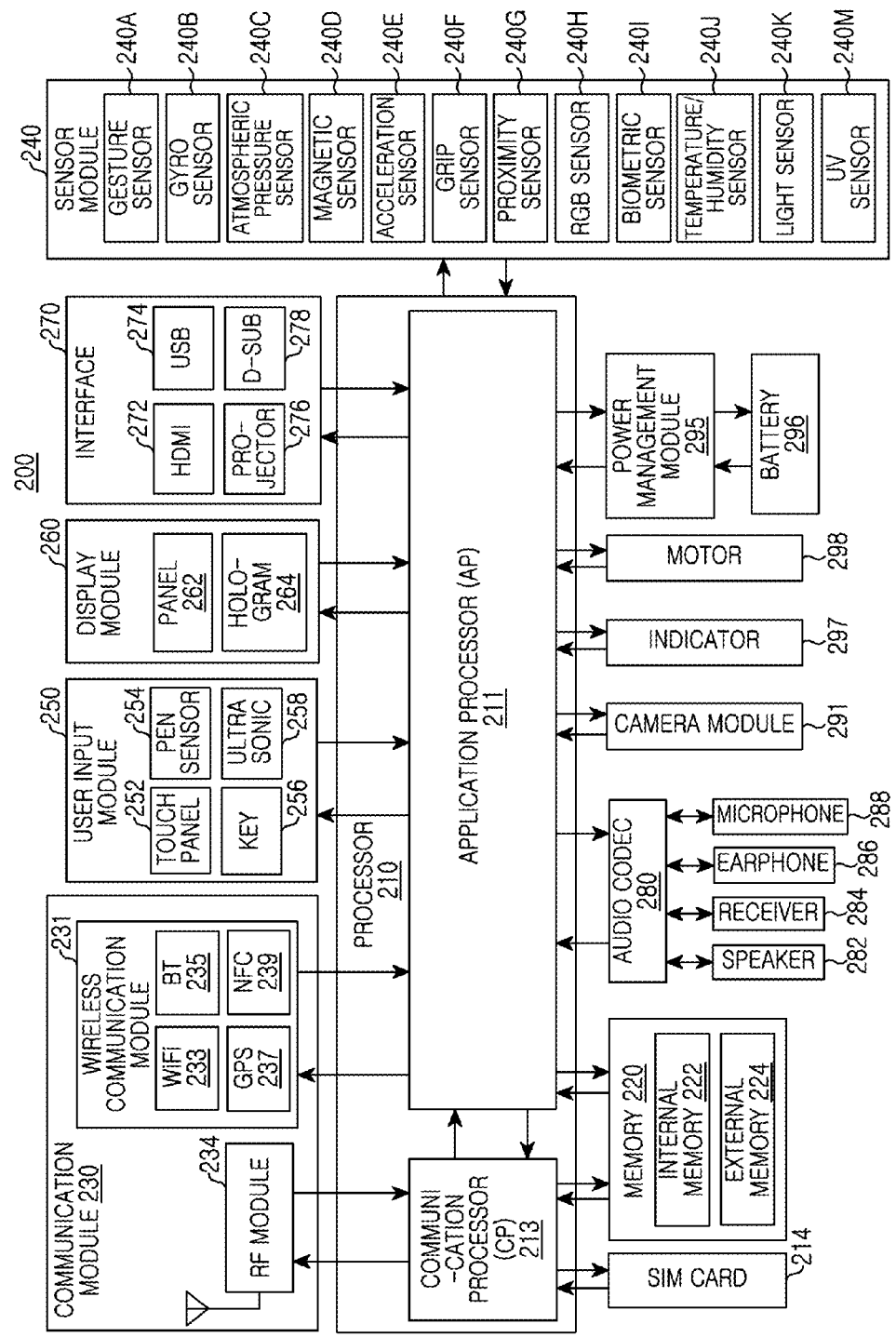
FIG. 2 is a block diagram of an example of hardware according to aspects disclosure.

FIG. 2 is a block diagram of an example of hardware 200 according to aspects disclosure. The hardware 200 can be, for example, the electronic device 100 of FIG. 1. Referring to FIG. 2, the hardware 200 can include one or more processors 210, a Subscriber Identity Module (SIM) card 214, a memory 220, a communication module 230, a sensor module 240, a user input module 250, a display module 260, an interface 270, an audio codec 280, a camera module 291, a power management module 295, a battery 296, an indicator 297, and a motor 298.

The processor 210 (e.g., the processor 120) can include one or more Application Processor (APs) 211 and one or more Communication Processors (CPs) 213. For example, the processor 210 can be the processor 120 of FIG. 1. While the AP 211 and the CP 213 are included in the processor 210 of FIG. 2, the AP 211 and the CP 311 can be included in different Integrated Circuit (IC) packages. The AP 211 and the CP 311 can be included in a single IC package. The processor 210 can determine whether a wearable electronic device is placed within preset distance and angle range, and determine whether to send information data to the wearable electronic device according to a type of the information to display when the wearable electronic device is placed within the preset distance and angle range. The processor 210 can determine using a camera whether eyeballs of the user are placed within the preset distance and angle range. When the information type is independent information irrelevant to the current content displayed, the processor 210 can determine to display the independent information at a preset location. When the information type is additional information relating to the current content displayed, the processor 210 can determine to send the additional information to the wearable electronic device. When the wearable electronic device is not placed within the preset distance and angle range, the processor 210 can determine the type of the information to display. The processor 210 can determine which one of first through fourth preset angle ranges the wearable electronic device inside the preset distance range is placed in, determine whether the angle range of the wearable electronic device matches a direction of the current screen, and when the angle range of the wearable electronic device does not match the direction of the current screen, rotate the screen direction to match the angle range of the wearable electronic device. The processor 210 can determine whether the wearable electronic device inside the preset distance and angle range gets out of the preset distance and angle range. The processor 210 can confirm that the displayed content is paused, and confirm that the paused content play is ended when a preset time passes. The processor 210 can continue the content play from the pause point of the first electronic device, based on the received content data. The processor 210 can detect at least one of the rotation of the displayed content and the selection of the displayed content. Using at least one of a gyro sensor and an acceleration sensor, the processor 210 can determine whether the displayed content is rotated. The processor 210 can confirm that one of one or more displayed contents is selected, and switch to an edit mode for editing the captured content. The processor 210 can confirm that first information display is paused, and then display second information at a preset location. The processor 210 of the wearable electronic device can confirm that the first information display is paused and then the second information is displayed at the preset location. The processor 210 can locate the wearable electronic device in the preset distance and angle range from the first electronic device, detect its movement from the preset distance and angle range of the first electronic device to the preset distance and angle range of the second electronic device, and confirm a relative location from the electronic device at one of first through fourth preset locations.

The AP 211 can control hardware or software components connected to the AP 211 by driving an operating system or an application program, and carry out data processing and operations including multimedia data. For example, the AP 211 can be implemented using a System on Chip (SoC). The processor 210 can further include a Graphics Processing Unit (GPU) (not shown).

The CP 213 can manage data links and convert a communication protocol in the communication between the electronic device (e.g., the electronic device 100) including the hardware 200 and the other electronic devices connected over the network. For example, the CP 213 can be implemented using a SoC. The CP 213 can perform at least part of the multimedia control function. The CP 213 can identify and authenticate a terminal in the communication network using the SIM card 214. In so doing, the CP 213 can provide the user with a service including voice telephony, video telephony, text message, and packet data.

The CP 213 can control the data transmission and reception of the communication module 230. While the components of the CP 213, the power management module 295, and the memory 220 are separated from the AP 211 in FIG. 2, the AP 211 can include part (e.g., the CP 213) of those components.

The AP 211 or the CP 213 can load and process the instruction or the data received from its non-volatile memory or at least one of the other components, in a volatile memory. The AP 211 or the CP 213 can store data received from or generated by at least one of the other components, in the non-volatile memory.

The SIM card 214 can be inserted to a slot formed at a specific location of the electronic device. The SIM card 214 can contain unique identification information (e.g., Integrated Circuit Card Identifier (ICCID)) or subscriber information (e.g., International Mobile Subscriber Identity (IMSI)).

The memory 220 can include an internal memory 222 and an external memory 224. For example, the memory 220 can be the memory 130 of FIG. 1. The internal memory 222 can include at least one of the volatile memory (e.g., Dynamic Random Access Memory (DRAM), Static RAM (SRAM), Synchronous DRAM (SDRAM)) and the non-volatile memory (e.g., One-Time Programmable Read Only Memory (OTPROM), PROM, Erasable PROM (EPROM), Electrically EPROM (EEPROM), mask ROM, flash ROM, NAND flash memory, NOR flash memory). The internal memory 222 may employ a Solid State Drive (SSD). The external memory 224 can further include, for example, a Compact Flash (CF), a Secure Digital (SD), a Micro-SD, a Mini-SD, an extreme digital (xD), and a memory stick.

The communication module 230 can include a wireless communication module 231 and a Radio Frequency (RF) module 234. For example, the communication module 230 can be the communication module 160 of FIG. 1. For example, the wireless communication module 231 can include a Wi-Fi module 233, a Bluetooth (BT) module 235, a GPS module 237, and an NFC module 239. For example, the wireless communication module 231 can provide a wireless communication function using a radio frequency. Additionally or substantially, the wireless communication module 231 can include a network interface (e.g., LAN card) or a modem for connecting the hardware 200 to the network (e.g., Internet, LAN, WAN, telecommunication network, cellular network, satellite network, or POTS). When the information type is the additional information relating to the current content displayed, the communication module 230 can send the additional information to the wearable electronic device. When the information type is the independent information irrelevant to the current content displayed, the communication module 230 can send the independent information data to the wearable electronic device. When the wearable electronic device is placed outside the preset distance and angle range, the communication module 230 can send the content data to the wearable electronic device so that the second electronic device can play the displayed content. When the wearable electronic device is placed within the preset distance and angle range, the communication module 230 can receive the content data played by the first electronic device, from the wearable electronic device. Upon detecting at least one operation, the communication module 230 can send the content data to the wearable electronic device. When one of one or more displayed contents is selected, the communication module 230 can send the selected content data to the wearable electronic device so that the wearable electronic device can play the selected content. When the wearable electronic device is placed within the preset distance and angle range, the communication module 230 can receive the content information captured by the wearable electronic device. The communication module 230 of the wearable electronic device can receive data of first information from the electronic device when a first preset condition is satisfied, and pause the first information display or receive data of second information from the electronic device so as to display the second information when the first preset condition is switched to a second preset condition. The communication module 230 of the wearable electronic device can receive data of third information from the electronic device when the first preset condition is switched to a third preset condition, receive data of the content played by the first electronic device, and send data of the received content to the second electronic device. The communication module 230 of the wearable electronic device can receive data of the content played by the first electronic device, and send data of an object captured by the electronic device when it is placed within the preset distance and angle range from the electronic device within a preset time.

The RF module 234 can transmit and receive the data, for example, an RF signal or a paged electric signal. For example, the RF module 234 can includes a transceiver, a Pulse Amplitude Modulation (PAM), a frequency filter, or a Low Noise Amplifier (LNA) which are not shown. The RF module 234 can further include a component, for example, conductor or conducting wire for sending and receiving electromagnetic waves in free space in the wireless communication.

The sensor module 240 can include at least one of a gesture sensor 240A, a gyro sensor 240B, an atmospheric pressure sensor 240C, a magnetic sensor 240D, an acceleration sensor 240E, a grip sensor 240F, a proximity sensor 240G, a Red Green Blue (RGB) sensor 240H, a biometric sensor 240I, a temperature/humidity sensor 240J, a light sensor 240K, and an UltraViolet (UV) sensor 240M. The sensor module 240 can measure a physical quantity or detect the operation status of the electronic device, and convert the measured or detected information to an electric signal. Additionally or alternatively, the sensor module 240 can include an E-noise sensor (not shown), an electromyography (EMG) sensor (not shown), an electroencephalogram (EEG) sensor (not shown), an electrocardiogram (ECG) sensor (not shown), or a fingerprint sensor. The sensor module 240 can further include a control circuit for controlling its one or more sensors.

The user input module 250 can include a touch panel 252, a (digital) pen sensor 254, a key 256, and an ultrasonic input device 258. For example, the user input module 250 can be the user input module 140 of FIG. 1. The touch panel 252 can recognize the touch input using at least one of capacitive, resistive, infrared, and Surface Acoustic Wave (SAW) techniques. The touch panel 252 may further include a controller (not shown). The capacitive touch panel can recognize not only the direct touch but also the proximity. The touch panel 252 may further include a tactile layer. In this case, the touch panel 252 can provide a tactile response to the user.

The (digital) pen sensor 254 can be implemented using the same or similar method as or to the user's touch input, or using a separate recognition sheet. For example, the key 256 can include a keypad or a touch key. The ultrasonic input device 258 obtains data by detecting microwave through a microphone (e.g., a microphone 288) in the electronic device through the pen which generates an ultrasonic signal, and allows radio frequency identification. The hardware 200 may receive the user input from an external device (e.g., a network 102, a computer, or a server 164) connected using the communication module 230.

The display module 260 can include a panel 262 or a hologram 264. For example, the display module 260 can be the display module 150 of FIG. 1. The panel 262 can employ a Liquid Crystal Display (LCD) or an Active Matrix Organic Light Emitting Diode (AMOLED). The panel 262 can be implemented flexibly, transparently, or wearably. For example, the panel 262 may be constructed as a single module with the touch panel 252. The hologram 264 can present a three-dimensional image in the air using interference of light. The display module 260 can further include a control circuit for controlling the panel 262 or the hologram 264. When the information type is the independent information irrelevant to the current content displayed, the display module 260 can display the independent information at the preset location. The display module 260 of the wearable electronic device can display the first information at the preset location and third information at the preset location. The display module 260 of the wearable electronic device can display at the preset location the content information played by the electronic device according to the relative location from the electronic device based on the received data, and display the content information in one of first through fourth preset regions according to the location.

The interface 270 can include, for example, a High Definition Multimedia Interface (HDMI) 272, a Universal Serial Bus (USB) 274, a projector 276, and a D-sub 278. Additionally or substantially, the interface 270 can include, for example, a SD/Multi-Media Card (MMC) (not shown) or IrDA (not shown).

The audio codec 280 can convert the voice to an electric signal and vice versa. For example, the audio codec 280 can convert voice information which is input or output through a speaker 282, a receiver 284, an earphone 286, or the microphone 288.

The camera module 291 can capture a still picture and a moving picture, and include one or more image sensors (e.g., front lens or rear lens), an Image Signal Processor (ISP) (not shown), or a flash LED (not shown).

The power management module 295 can manage power of the hardware 200. For example, the power management module 295 can include, for example, a Power Management IC (PMIC), a charging IC, or a battery gauge which are not shown.

For example, the PMIC can be mounted in an IC or a SoC semiconductor. The charging type can be divided to a wired type and a wireless type. The charging IC can charge the battery and prevent overvoltage or overcurrent from flowing from a charger. The charging IC can include a charging IC for at least one of the wired charging type or the wireless charging type. For example, the wireless charging type includes magnetic resonance, magnetic induction, and microwave, and can further include an additional circuit, for example, coil loop, resonance circuit, rectifier circuit for the wireless charging.

The battery gauge can measure the remaining capacity of the battery 296 and the voltage, the current, or the temperature of the charging. The battery 296 can supply the power by generating the electricity. For example, the battery 296 can be a rechargeable battery.

The indicator 297 can display a specific status, for example, booting state, message state, or charging state of the hardware 200 or part (e.g., AP 211) of the hardware 200. The motor 298 can convert the electric signal to a mechanic vibration. An MCU (Main Control Unit) (not shown) can control the sensor module 240.

Although it is not depicted, the hardware 200 can further include a processor (e.g., GPU) for supporting mobile TV. For example, the processor for supporting the mobile TV can process media data in conformity with Digital Multimedia Broadcasting (DMB), Digital Video Broadcasting (DVB), or media flow standard.

The names of the hardware components of the present disclosure can differ according to the type of the electronic device. The hardware of the present disclosure can include at least one of the components, omit some components, or further include other components. Some of the hardware components can be united to the single entity to carry out the same functions of the corresponding components.

Figure 3:
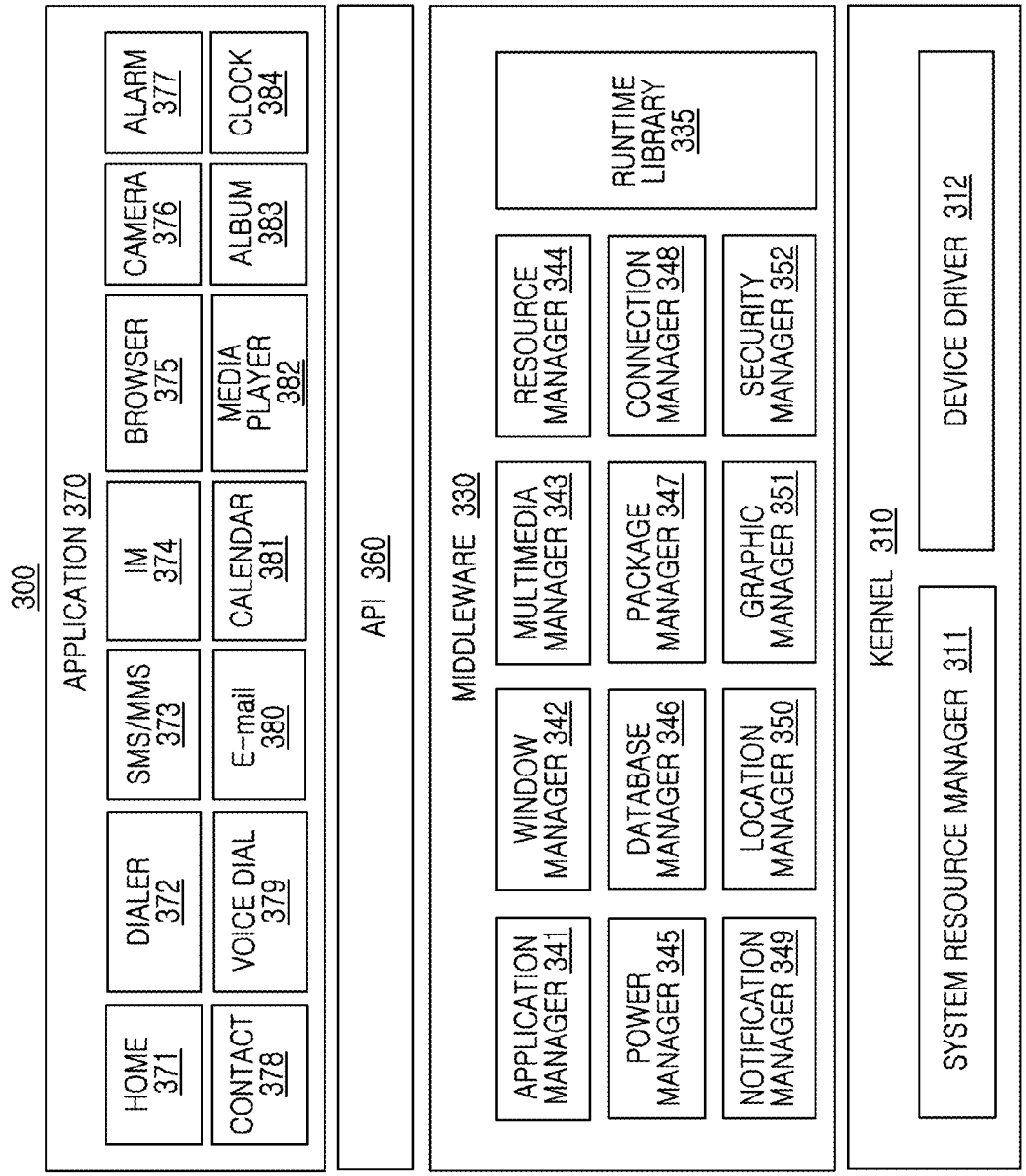
FIG. 3 is a block diagram of an example of a programming module 300 according to aspects of the disclosure.

FIG. 3 is a block diagram of an example of a programming module 300 according to aspects of the disclosure. The programming module 300 can be included (e.g., stored) in the electronic device 100 (e.g., the memory 130) of FIG. 1. At least part of the programming module 300 can include software, firmware, hardware, or a combination of at least two of them. The programming module 300 can include an Operating System (OS) for controlling resources of the electronic device (e.g., the electronic device 100) in the hardware 200, and various applications (e.g., the application 370) driven on the OS. For example, the OS can include Android, iOS, Windows, Symbian, Tizen, and Bada. Referring to FIG. 3, the programming module 300 can include a kernel 310, a middleware 330, an API 360, and an application 370.

The kernel 310 (e.g., the kernel 131) can include a system resource manager 311 and a device driver 312. For example, the system resource manager 311 can include a process manager (not shown), a memory manager (not shown), and a file system manager (not shown). The system resource manager (not shown) can control, allocate, or reclaim the system resource. The device driver 312 can include a display driver (not shown), a camera driver (not shown), a BT driver (not shown), a shared memory driver (not shown), a USB driver (not shown), a keypad driver (not shown), a Wi-Fi driver (not shown), and an audio driver (not shown). The device driver 312 can include and an Inter-Process Communication (IPC) driver (not shown).

The middleware 330 can include a plurality of preset modules for providing the common function required by the application 370. The middleware 330 can allow the application 370 to efficiently use the limited system resources of the electronic device through the API 360. For example, as shown in FIG. 3, the middleware 330 (e.g., the middleware 132) can include at least one of a runtime library 335, an application manager 341, a window manager 342, a multimedia manager 343, a resource manager 344, a power manager 345, a database manager 346, a package manage 347, a connectivity manager 348, a notification manager 349, a location manager 350, a graphic manager 351, and a security manager 352.

The runtime library 335 can include, for example, a library module used by a compiler to add a new function using a programming language while the application 370 is executed. The runtime library 335 can function for input/output, memory management, and arithmetic function.

The application manager 341 can manage, for example, a life cycle of at least one of the application 370. The window manager 342 can manage GUI resources used in the screen. The multimedia manage 343 can identify a format required to play various media files, and encode or decode the media file using a codec suitable for the corresponding format. The resource manager 344 can manage a source code, a memory, a storage space of at least one of the application 370.

The power manager 345 can manage the battery or the power in association with BIOS, and provide power information for the operation. The database manager 346 can manage to generate, retrieve, or change a database to be used by at least one of the application 370. The packet manager 347 can manage installation or update of the application distributed as a packet file.

The connectivity manager 348 can manage, for example, the wireless connection of the Wi-Fi or the BT. The notification manager 349 can display or notify an event of an incoming message, an appointment, and proximity to the user without interruption. The location manager 350 can manage location information of the electronic device. The graphic manager 351 can manage graphical effect for the user or its related user interface. The security manager 352 can provide a security function for the system security or the user authentication. When the electronic device (e.g., the electronic device 100) has a call function, the middleware 330 can further include a telephony manager (not shown) for managing the voice or video call function of the electronic device.

The middleware 330 can generate and use a new middleware module by combining various functions of the internal component modules. The middleware 330 can provide a specialized module per OS so as to provide a differentiated function. The middleware 330 can dynamically remove some components or add new components. Hence, the examples provided throughout the present disclosure can omit some of the components, include other components, or replace with other components of similar functions.

The API 360 (e.g., the API 133), which is a set of API programming functions, can differ according to the OS. For example, in Android and iOS, one API set can be provided per platform. In Tizen, one or more API sets can be provided.

The application 370 (e.g., the application 134) can include, for example, a preload application or a third party application.

At least part of the programming module 300 can be implemented using an instruction stored in computer-readable storage media. When the one or more processors (e.g., the processors 210) execute the instruction, it or they can perform the function corresponding to the instruction. The computer-readable storage medium can be the memory 220. Part of the programming module 300 can be realized (e.g., executed) by the processors 210. Part of the programming module 300 can include a module, a program, a routine, an instruction set, or a process for one or more functions.

The names of the components of the programming module (e.g., the programming module 300) can differ according to the type of the OS. The programming module can include at least one of the components, omit some components, or further include other components.

FIGS. 4A and 4B are diagrams illustrating an example of a process for displaying information on wearable devices, according to aspects of the disclosure. According to the process, an electronic device 401 can determine whether a wearable electronic device 402 is at least one of: (i) placed within a preset distance from the electronic device 401 and (ii) placed within a preset angle range 403. In some implementations, when the wearable electronic device includes a head-mounted display unit, detecting whether the wearable electronic device is located within the preset distance and angle range may include detecting a gaze of a user wearing the wearable electronic device. For example, the electronic device 401 may capture images with the electronic device 401's camera and process those images using an image recognition technique to determine whether the eyes of a user wearing the wearable electronic device 402 (or another feature of the user or the wearable device) are visible in the images. If the user's eyes can be recognized, and/or another criterion is satisfied, the electronic device 401 can determine that the wearable electronic device 402 is within the preset distance and range. In some implementation, the wearable electronic device 401 may be one that is paired or otherwise connected to the electronic device 401 via a wireless or wired protocol (e.g., Bluetooth, WiFi, etc.)

When the wearable electronic device 402 is not placed within the preset distance and angle range 403 as shown in FIG. 4A, the electronic device 401 can determine whether a data item is unrelated to a content currently displayed on the electronic device 401. In some implementations, the determination may be made based on a type of the data item. For instance, if the data item is a text message, the data item may be considered unrelated to the content. By contrast, if the data item includes subtitles for the content, the data item may be considered related to the content.

When the data item is unrelated to the current content, the electronic device 401 can send the data item to the wearable electronic device 402. For example, when the electronic device 401 receives a text message "hello" from "Sam", while a user is wearing the wearable electronic device 402, and the electronic device 401 is placed in a user's bag, the electronic device 401 can send the received text message to the wearable electronic device 402 so that the wearable electronic device 402 can display the text message. Hence, the user can easily see the text message "hello" received from "Sam" through the wearable electronic device 402 without having to take the electronic device 401 out of the bag.

When the wearable electronic device 402 is placed in the preset distance and angle range 403, as shown in FIG. 4B, and the data item is unrelated to the current content, the electronic device 401 can display the data item at a preset location on a display screen of the electronic device 401. For example, when the electronic device 401 detects the user's gaze wearing the wearable electronic device 402, there is no need to display the data item on the wearable electronic device 402. For example, the electronic device 401 receives the text message "hello" from "Sam", the user is wearing the wearable electronic device 402, and the user is watching the electronic device 401.

FIGS. 5A and 5B are diagrams illustrating an example of a process for displaying information on wearable devices, according to aspects of the disclosure. According to the process, when a wearable electronic device 502 is at least one of: (i) placed within a preset distance from the electronic device 501 and (ii) placed within a preset angle range 503, an electronic device 501 can determine whether a data item is related to content that is currently displayed on the electronic device 501.

When the data item is related to the current content, the electronic device 501 can send the data item to the wearable electronic device 502. For example, the data item may include subtitles for a movie that is currently being played on the electronic device 501. Thus, while the movie is being played, the electronic device 501 can send the data item to the wearable electronic device 502 so that the wearable electronic device 502 can display subtitles for the movie.

As another example, when playing a music file, the electronic device 501 can send to the wearable electronic device 502 tag information and lyric information for the music file. As yet another example, when showing a terrestrial broadcasting, the electronic device 501 can send to the wearable electronic device channel information corresponding to the current broadcasting. As yet another example, when showing a sport broadcasting, the electronic device 501 can send to the wearable electronic device 502 additional information regarding one or more players, close-up information, and other stadium news.

When the wearable electronic device 502 is not placed in the preset distance and angle range 503 and the data item is unrelated to the content currently played (or otherwise displayed on the electronic device 501), the electronic device 501 can send the data item to the wearable electronic device 502 so that the independent information is displayed on the wearable electronic device 502.

Figure 6A:
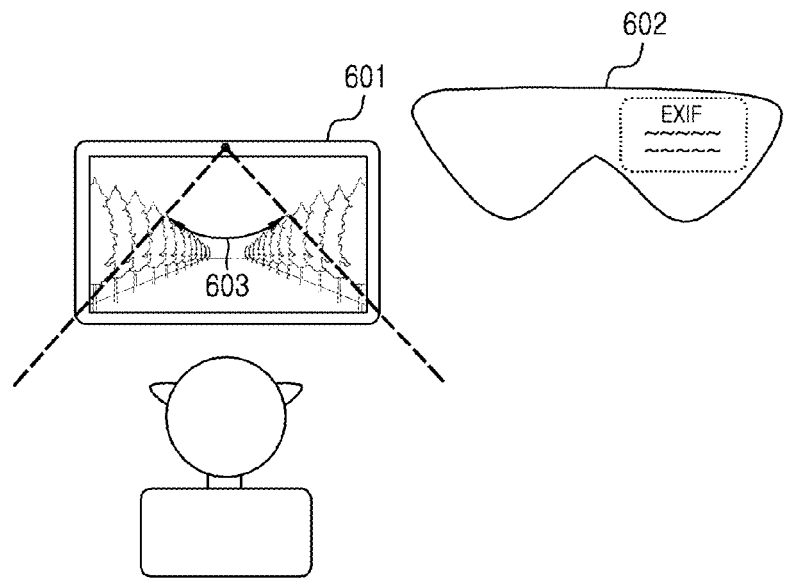
FIG. 6A and FIG. 6B are diagrams illustrating an example of a process for displaying information on wearable devices, according to aspects of the disclosure.
Figure 6B:
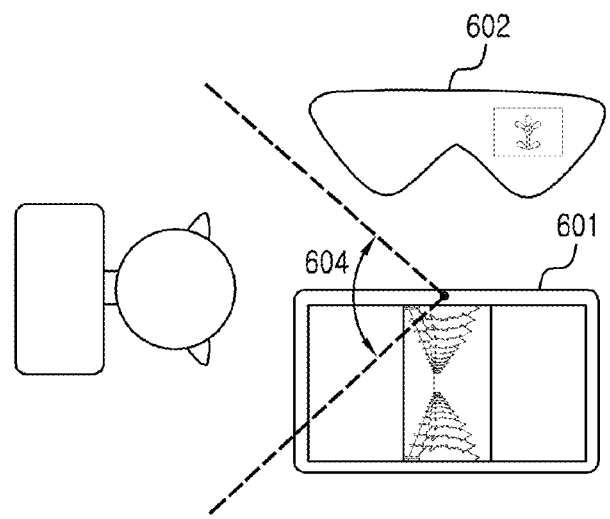

FIGS. 6A and 6B are diagrams illustrating an example of a process for displaying information on wearable devices, according to aspects of the disclosure. In this example a wearable electronic device 602 is within a preset distance range and preset angle range 603 from an electronic device 601. As shown in FIG. 6A, when the electronic device is within the angle range 603, the electronic device 601 can send to the wearable electronic device 602 a first data item related to content displayed on the electronic device 601. For example, when the electronic device 601 displays an image on its touch screen, the electronic device 601 may send to the wearable electronic device 602 Exif information that is embedded in the image. The wearable electronic device 602 can in turn display the Exif information in a preset region(s) of its display(s).

When the location of the wearable electronic device 602 is changed as shown in FIG. 6B, the electronic device 601 can automatically change the data item displayed on the wearable electronic device 602. In some aspects, in response to the wearable electronic device entering the angle range 604, the electronic device 601 can transmit to the wearable electronic device 601 a second data item. For example, the electronic device 601 can send to the wearable electronic device 602 an image captured at the same place as the image displayed on the touch screen (e.g., an image whose geotag matches a geotag of the displayed image). Thus, in some aspects, the data item provided to the wearable electronic device 602 may be selected by the electronic device based on the position of the wearable electronic device 602 relative to the electronic device 601. As noted above, in some implementations, the position of the wearable electronic device 602 relative to the electronic device 601 may be determined by using a camera of the electronic device 601.

FIGS. 7A and 7B are diagrams illustrating an example of a process for displaying information on wearable devices, according to aspects of the disclosure. According to the example, an electronic device 701 can display an image file on its touch screen as shown in FIG. 7A. The electronic device 701 can detect wearable the electronic device 702 and send a data item to the electronic device in the manner discussed above with respect to FIGS. 4A-6B. When the position of the wearable electronic device relative to the electronic device 701 is outside the preset angle range 702, the electronic device 701 can send the image file (or other content) currently displayed on the touch screen, to the wearable electronic device so that the content display could be continued on the wearable electronic device. In some aspects, the image file (or other content) can be transmitted in response to at least one of: (i) the wearable electronic device becoming located further than a preset distance from the electronic device 701 and (ii) exiting a preset angle range 702. Additionally or alternatively, the image file (or other content) may be transmitted in response to a change in the gaze of a user wearing the wearable electronic device.

Figure 8A:
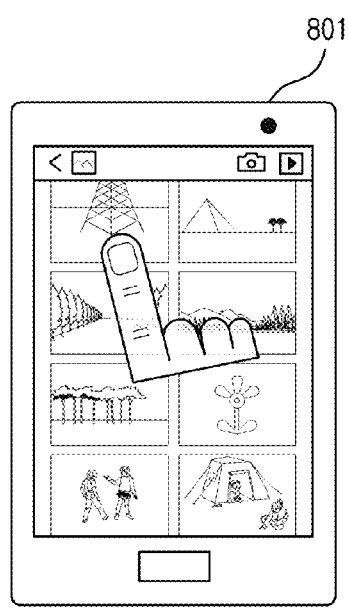
FIG. 8A and FIG. 8B are diagrams illustrating an example of a process for displaying information on wearable devices, according to aspects of the disclosure.
Figure 8B:
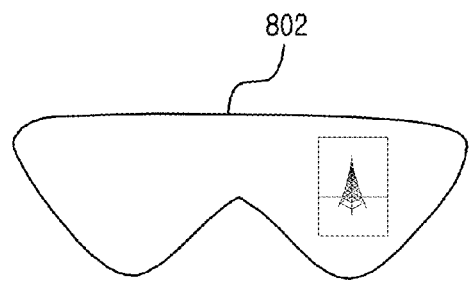

FIGS. 8A and 8B are diagrams illustrating an example of a process for displaying information on wearable electronic devices, according to aspects of the disclosure. According to the process, an electronic device 801 displays a plurality of image thumbnails. In some implementations, one or more of the image thumbnails may include only a portion of the thumbnails' respective images. Next, one of the thumbnails displayed on the electronic device 801 can be selected. More specifically, the electronic device 801 can receive user's touch input for selecting one of the thumbnails displayed on the touch screen. Next, the electronic device 801 can send the image corresponding to the selected thumbnail to a wearable electronic device 802. The electronic device 802 can receive the selected image from the electronic device 801 and display the whole image file in the preset region.

Figure 9:
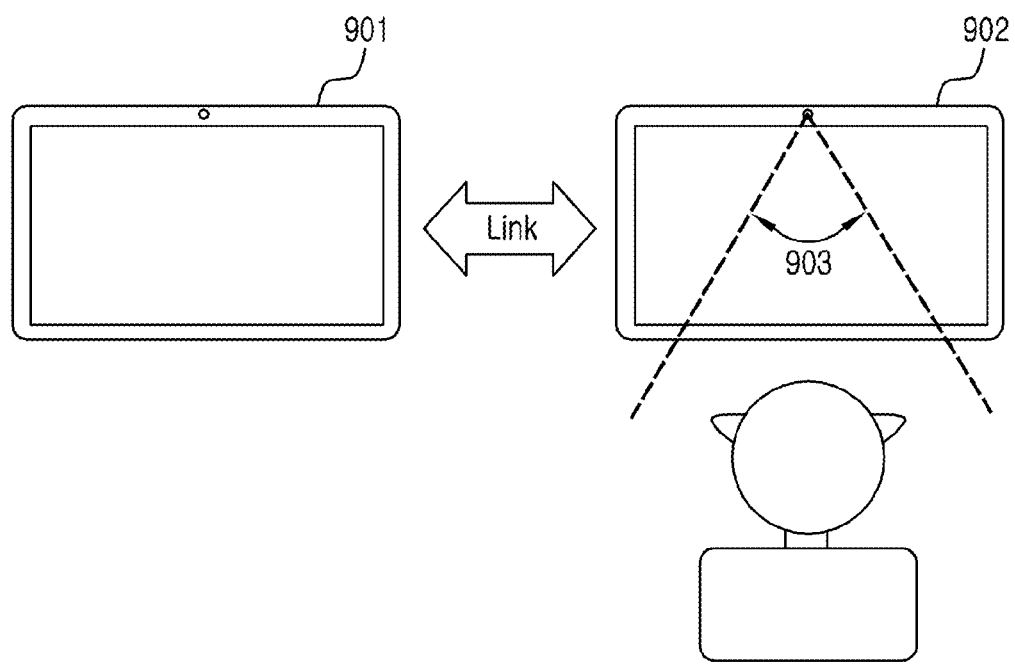
FIG. 9 is a diagram illustrating an example of a process for displaying information on wearable devices, according to aspects of the disclosure.

FIG. 9 is a diagram illustrating an example of a process for displaying information on wearable electronic devices, according to aspects of the disclosure. In this example, a first electronic device 901, a second electronic device 902, and a wearable electronic device are connected via a wired or wireless protocol, the first electronic device 901 plays a music content, and the second electronic device 902 plays a video content. When the wearable electronic device is placed within a preset distance and a first preset angle range from the first electronic device 901, the first electronic device 901 can send to the wearable electronic device tag information and lyric information of the played music content. Next, when the wearable electronic device is placed within the preset distance and second preset angle range 903 from the second electronic device 903, the second electronic device 902 can send to the wearable electronic device tag information and subtitle information corresponding the played movie content.

Figure 10:
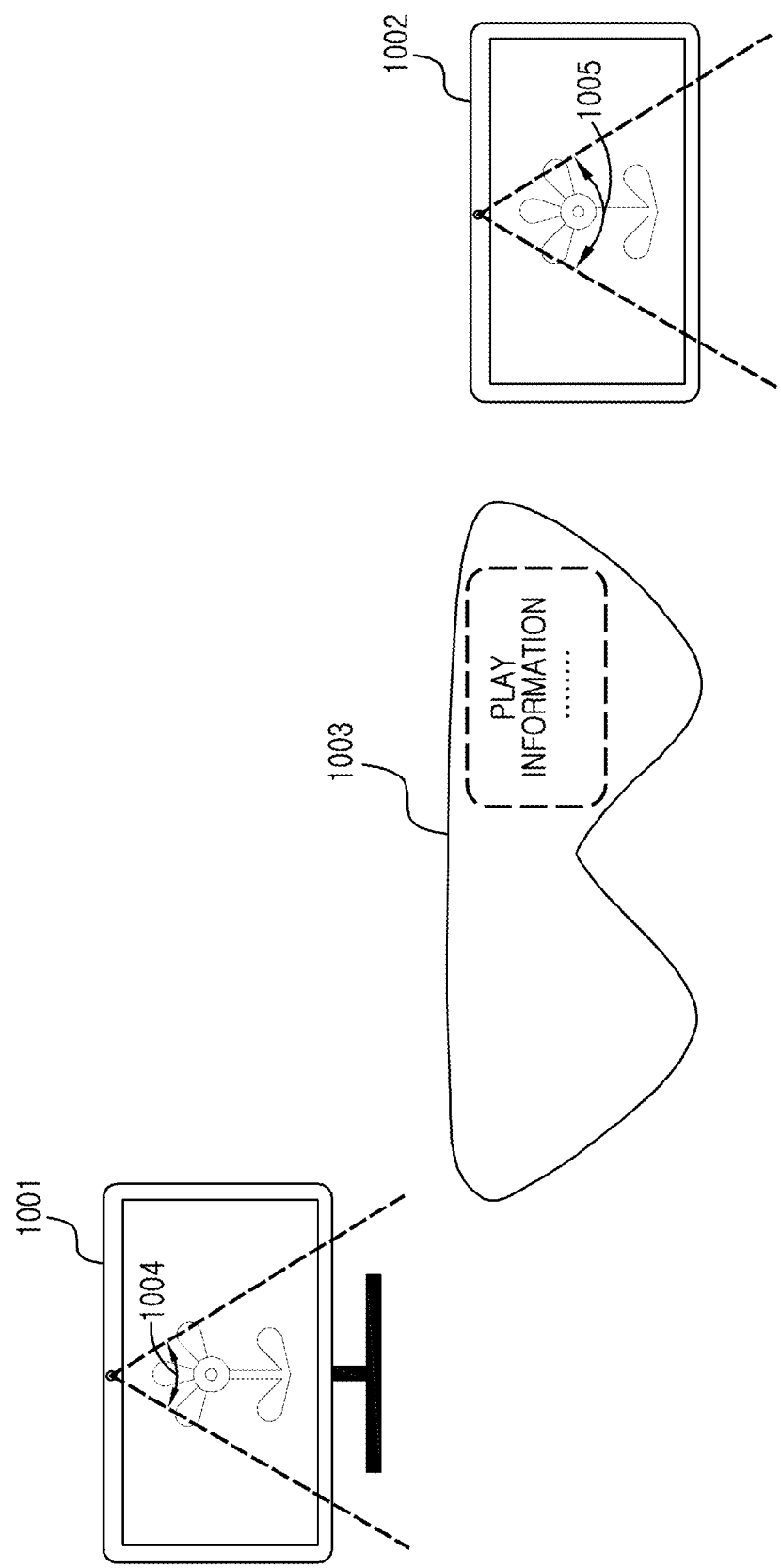
FIG. 10 is a diagram illustrating an example of a process for device state synchronization, according to aspects of the disclosure.

FIG. 10 is a diagram illustrating an example of a process for device state synchronization, according to aspects of the disclosure. In this example, a first electronic device 1001 plays a video content. Next, the first electronic device 1001 detects that a wearable electronic device 1003 is located within a preset distance and preset angle range 1004, and plays a video content. The first electronic device 1001 can send to the wearable electronic device 1003 a data item related to the video content. For example, the first electronic device 1001 can send to the wearable electronic device 1003 the additional information of the tag information and the subtitle information of the video content. Afterwards, the wearable electronic device 1003 can receive the data item and display the data item in a preset region.

Next, when the wearable electronic device 1003 becomes separated from the first electronic device 101 by more than the preset distance and/or leaves the preset angle range 1004, the first electronic device 1001 can pause the playback of the video content. In addition, the first electronic device can send data of the content displayed on the touch screen to the wearable electronic device 1003. By way of example, the content data can include at least one of a content title, a storage location, and a pause point (e.g., an indication of a time at which a playback of the content is paused). Afterwards, when a predetermined time-out period expires after the wearable electronic device becomes separated from the first electronic device (and/or becomes located outside of the first angle range 1004), the first electronic device 1003 can turn off its display unit.

Additionally or alternatively, the first electronic device 1001 may send the data item to the wearable electronic device 1003 in response to detecting a change in the gaze of a user wearing the wearable electronic device 1003

Next, when the wearable electronic device 1003 is placed within the preset distance and preset angle range 1005, the second electronic device 1002 can receive the data of the content played by the first electronic device 1001, from the wearable electronic device 1003. For example, the second electronic device 1002 can receive the data including the title, the stored location, and the pause point of the content played by the first electronic device 1001, from the wearable electronic device 1003. Based on the received information, the second electronic device 1002 can continue playback of the video from the point at which the video was paused on the device 1001.

Figure 11:
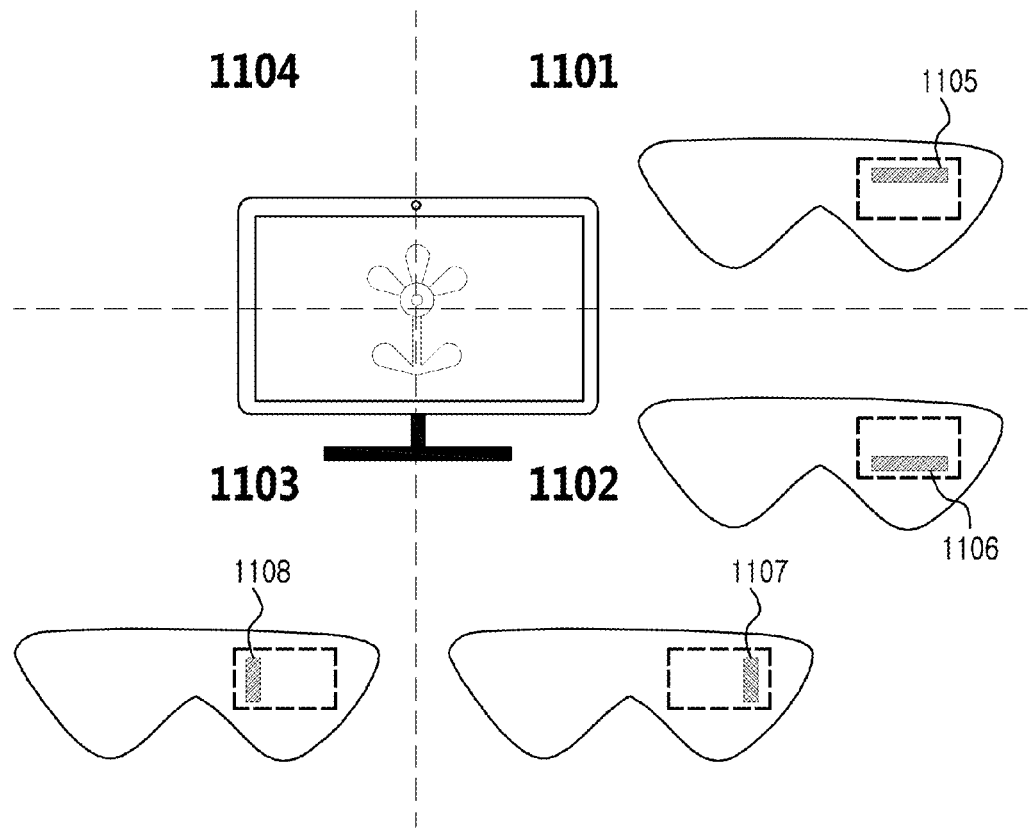
FIG. 11 is a diagram illustrating an example of a process for displaying information on wearable devices, according to aspects of the disclosure.

FIG. 11 is a diagram illustrating an example of a process for displaying information on wearable electronic devices, according to aspects of the disclosure. According to the process, the electronic device locates the wearable electronic device within a preset distance and a preset angle range and begins playback of a video content while the wearable electronic device displays subtitles for the video content.

The wearable electronic device can determine which one of four regions 1101 through 1104 it is placed. In the upper regions 1101 and 1104, the wearable electronic device can display the subtitle information of the video content played by the electronic device, at the top 1105. That is, in the upper regions 1101 and 1104, the wearable electronic device can display the subtitle information of the video content played by the electronic device, at the top 1105, so as to provide the straightforward subtitle information to the user.

In the lower regions 1102 and 1103, the wearable electronic device can display the subtitle information of the video content played by the electronic device, at the bottom 1106. That is, in the lower regions 1102 and 1103, the wearable electronic device can display the subtitle information of the video content played by the electronic device, at the bottom 1106, so as to provide the straightforward subtitle information to the user.

In the left regions 1101 and 1102, the wearable electronic device can display the subtitle information of the video content played by the electronic device, on the left 1107. That is, in the upper regions 1101 and 1102, the wearable electronic device can display the subtitle information of the video content played by the electronic device, on the left 1107, so as to provide the straightforward subtitle information to the user.

In the right regions 1103 and 1104, the wearable electronic device can display the subtitle information of the video content played by the electronic device, on the right 1108. That is, in the upper regions 1103 and 1104, the wearable electronic device can display the subtitle information of the video content played by the electronic device, on the left 1108, so as to provide the straightforward subtitle information to the user.

Figure 12A:
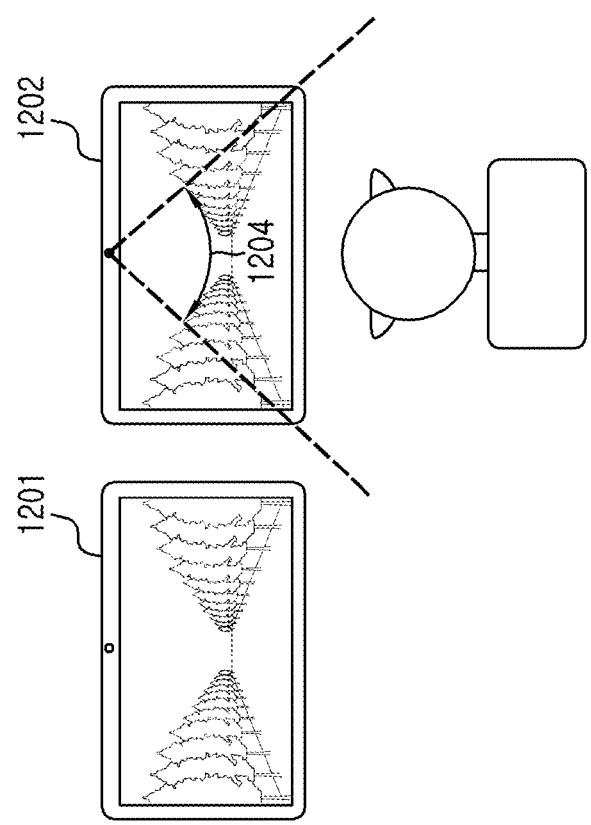
FIG. 12A and FIG. 12B are diagrams illustrating an example of a process for device state synchronization, according to aspects of the disclosure.
Figure 12B:
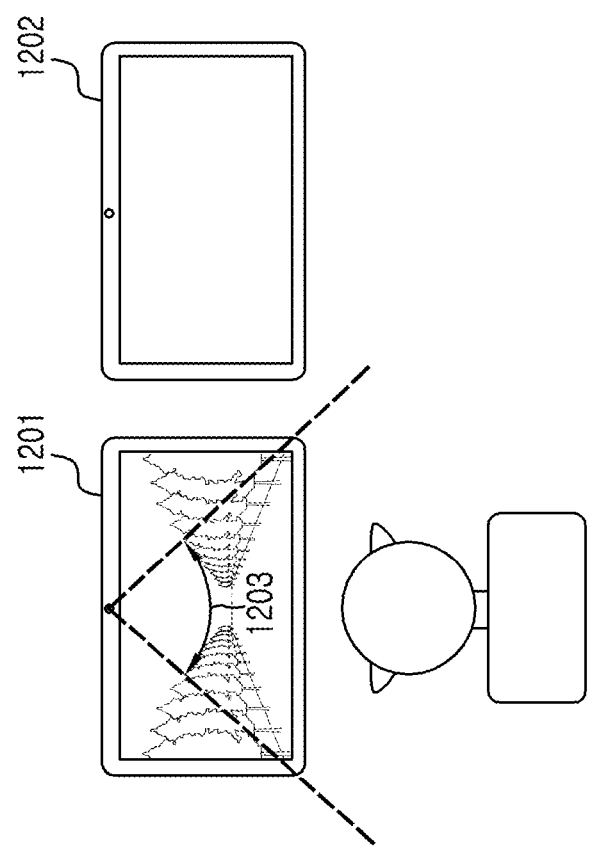

FIGS. 12A and 12B are diagrams illustrating an example of a process for device state synchronization, according to aspects of the disclosure. According to the example, a user is wearing a wearable electronic device, a first electronic device 1201 plays a video content.

When the wearable electronic device is placed within a preset distance and a preset angle range 1203 as shown in FIG. 12A, the first electronic device 1201 can send to the wearable electronic device the additional information of the tag information and the subtitle information of the played video content.

When the wearable electronic device is placed within a preset distance and/or preset angle range 1204 as shown in FIG. 12B, the second electronic device 1202 can send to the first electronic device 1201 data indicating that the wearable electronic device is placed in the preset distance and/or preset angle range 1204 of the second electronic device 1202.

Next, the first electronic device 1201 can send the video content to the second electronic device 1202. For example, the video content played by the first electronic device 1201 may be sent from the first electronic device 1201 to the second electronic device 1202, or to the second electronic device 1202 via the wearable electronic device. That is, the wearable electronic device may forward the video content from the first electronic device 1201 to the second electronic device 1202.

As noted above, in some aspects, the second electronic device 1202 may initiate a data sync with the first electronic device 1201 in response to detecting that the wearable electronic device has become at least one of (i) located within a preset distance from the second electronic device 1201 and (ii) located within the angle range 1204. The data that is synced may be selected by the first electronic device 1201 based on a record of a state of the electronic device (e.g., a record of what content was displayed on the first electronic device) at the time when the electronic device at least one of (i) became separated from the first electronic device by more than the preset distance and (ii) exited the angle range 1203. The first electronic device can send an indication of a pause point to the wearable device.

Figure 13A:
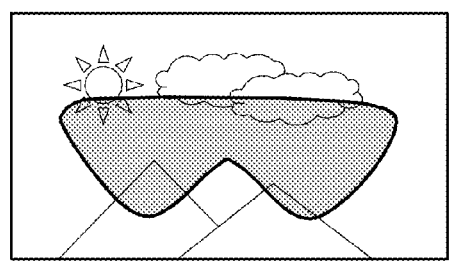
FIG. 13A and FIG. 13B are diagrams illustrating an example of a process for editing of content, according to aspects of the disclosure.
Figure 13B:
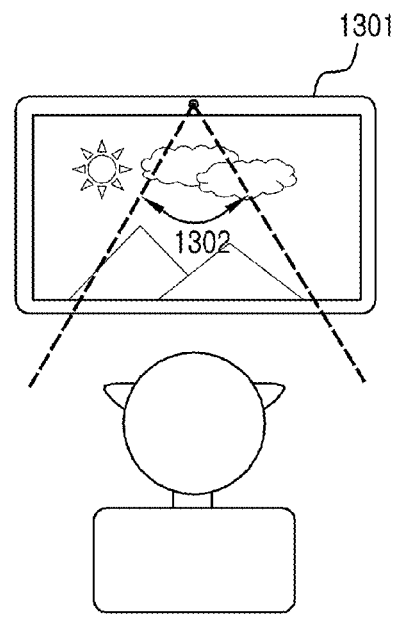

FIGS. 13A and 13B are diagrams illustrating an example of a process for editing of content, according to aspects of the disclosure. According to the process, when the wearable electronic device is placed within preset distance and preset angle range 1302 within a preset time, an electronic device 1301 can receive content captured by the wearable electronic device. Next, the electronic device 1301 can switch to the edit mode for editing the received content. For example, when receiving the image content from the wearable electronic device, the electronic device 1301 can switch to an image edit mode for editing the image. For example, when receiving the video content from the wearable electronic device, the electronic device 1301 can switch to a video edit mode for editing the video.

As another example, when receiving the content from the wearable electronic device within the preset time, the electronic device 1301 may enter the edit mode for editing the content in a predefined manner and concurrently play the music stored therein.

Additionally or alternatively, when receiving the content from the wearable electronic device within the preset time, the electronic device 1301 may enter the edit mode for editing the content in the predefined manner, and then play the stored music when the edit mode is ended. Herein, the preset time may be determined from a set information when the content is captured, the camera is operated, or detect preset user input.

Additionally or alternatively, when receiving the content from the wearable electronic device within the preset time, the electronic device 1301 may enter the edit mode for editing the content in the predefined manner, and then enter other function mode when the edit mode is ended.

Figure 14:
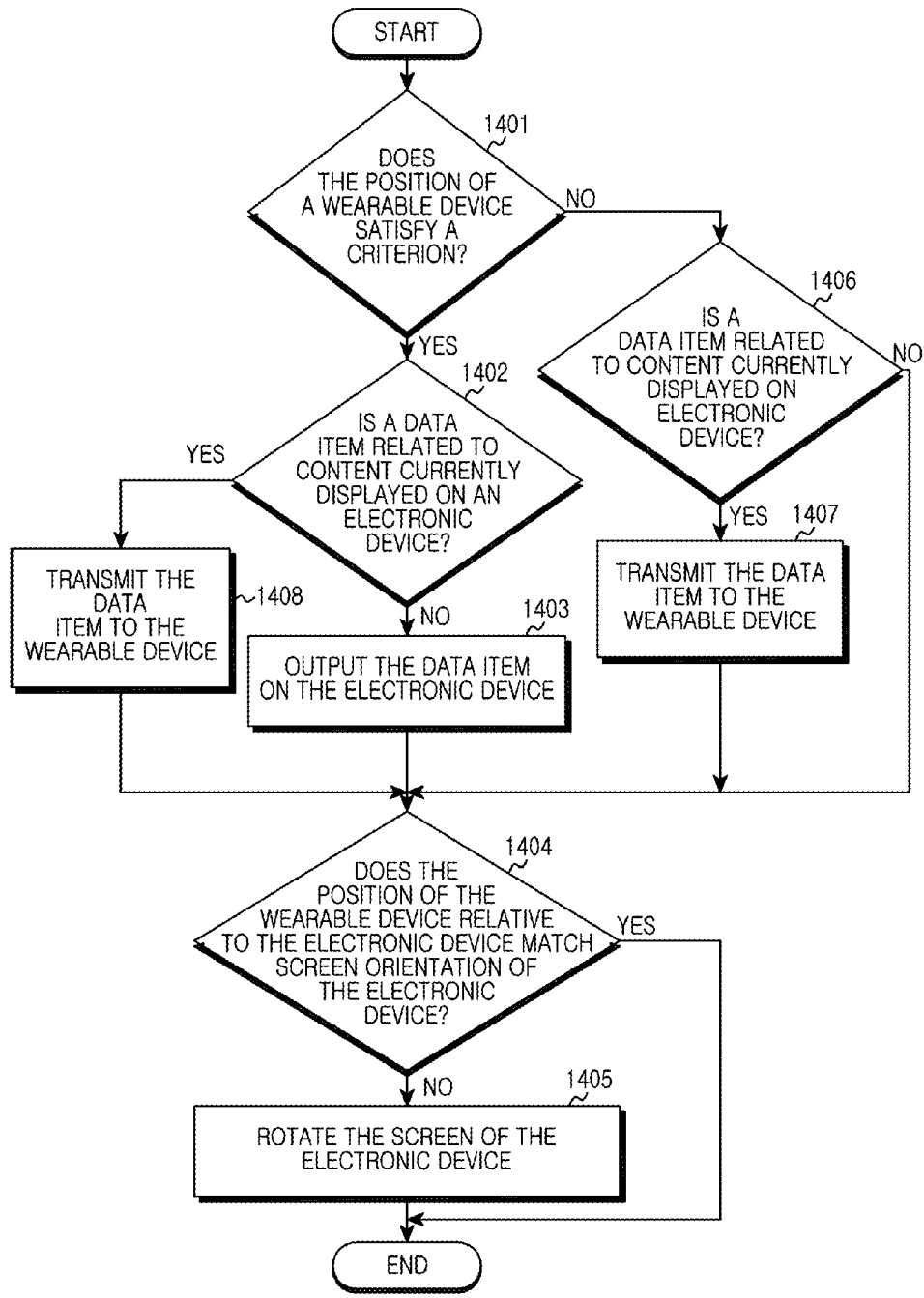
FIG. 14 is a flowchart of an example of a process, according to aspects of the disclosure.

FIG. 14 is a flowchart of an example of a process, according to aspects of the disclosure. In step 1401, an electronic device can detect whether the location of a wearable electronic device satisfies a predetermined criterion. In some aspects, the criterion may be satisfied when the wearable electronic device is at least one of (i) located within a predetermined distance from the electronic device and (ii) the wearable electronic device is located at a predetermined position relative to the electronic device.

In step 1402, the electronic device can determine whether a data item is related to content that is currently displayed on the electronic device. In step 1403, when the data item is unrelated, the electronic device can display the information item at a preset location in a display unit of the electronic device. In step 1408, when the information item is related to the current content, the electronic device can send the additional information data to the wearable electronic device for display.

In step 1404, the electronic device can detect whether the position of the wearable electronic device relative to the electronic device matches screen orientation of the electronic device. In step 1405, when the location of the wearable electronic device does not match the current screen orientation of the electronic device, the electronic device can change its screen orientation so as to match the location of the wearable electronic device. Changing the screen orientation may include, for example, changing the orientation of content displayed on the display unit of the electronic device from landscape to portrait, or vice versa.

In step 1406, the electronic device can determine whether a data item is related to content that is currently displayed on the electronic device. In step 1407, when the type of the information to display is unrelated to the current content, the electronic device can send the independent information data to the wearable electronic device in step 1407.

Figure 15:
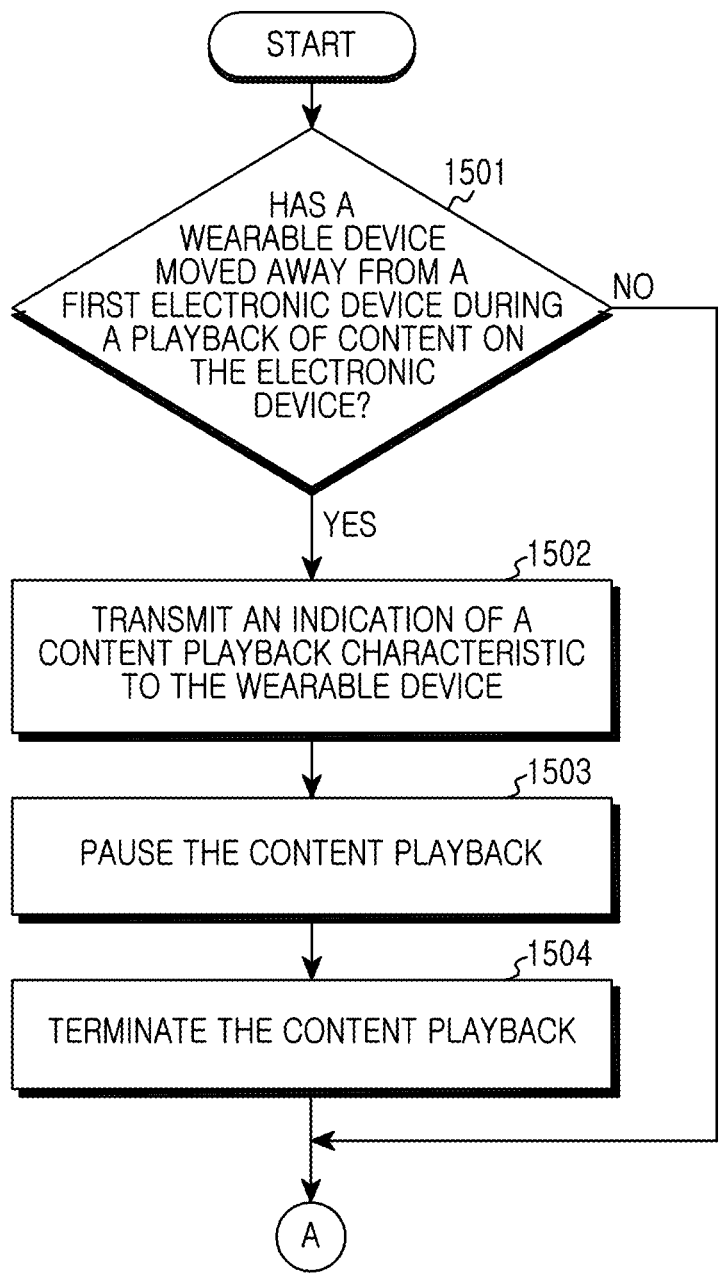
FIGS. 15 and 16 are flowcharts of an example of a process, according to aspects of the disclosure.
Figure 16:
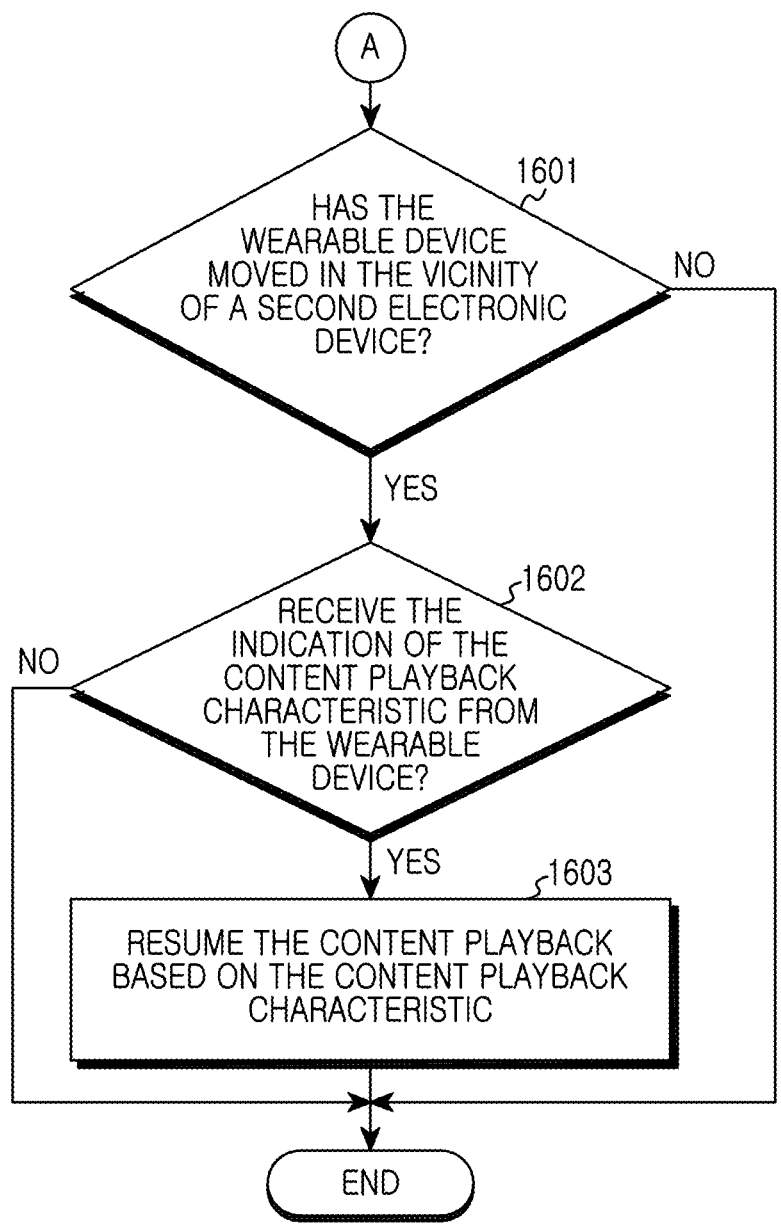

FIGS. 15 and 16 are flowcharts of an example of a process, according to aspects of the disclosure. In step 1501, a first electronic device determines whether a wearable electronic device has become separated from the first electronic device. For example, determining whether the wearable electronic device has become separated may include at least one of (i) determining whether the wearable electronic device is no longer within a predetermined distance from the first electronic device and (ii) determining whether the wearable electronic device is no longer within a predetermined angle range of the first electronic device. In step 1502, the first electronic device can send to the wearable electronic device an indication of a characteristic of a content playback (e.g., a video or audio playback) that is performed by the electronic device. For example, the characteristic may include, title of the content, a location from where the content can be retrieved, progress of the content playback, time from the start of the content at which the content playback is paused, and/or any other suitable characteristic of the state of the content playback. In step 1503, the first electronic device pauses the content playback. In step 1504, after a predetermined time-out period has passed since pausing the content playback, the first electronic device terminates the content playback.

In step 1601, a second electronic device may determine whether the wearable electronic device has moved in the vicinity of e second electronic device. In some implementations, determining whether the electronic device has moved in the vicinity of the second electronic device may include (i) determining whether the wearable electronic device is within a predetermined distance from the second electronic device and (ii) determining whether the wearable electronic device is within a predetermined angle range of the second electronic device. In step 1602, the second electronic device can receive the indication of the content playback characteristic. In step 1603, the second electronic device begins playing the content based on the indication of the content playback characteristic. By doing so, the second electronic device may begin playing the content from the point in the content where the content playback was stopped at the first electronic device.

Figure 17:
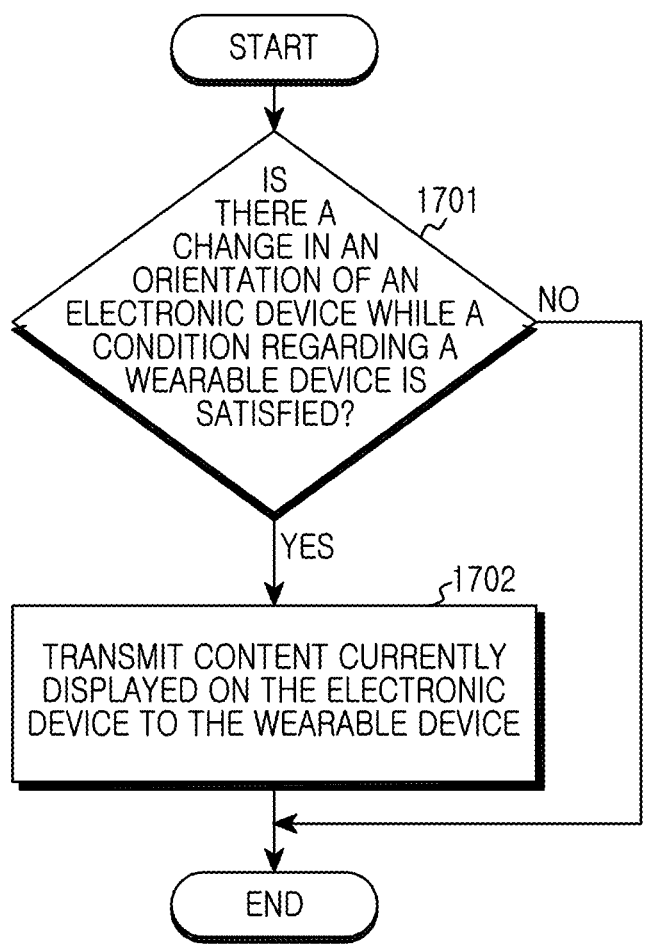
FIG. 17 is a flowchart of an example of a process, according to aspects of the disclosure.

FIG. 17 is a flowchart of an example of a process, according to aspects of the disclosure. In step 1701, an electronic device detects whether an orientation of the electronic device has changed while a condition regarding a wearable device is satisfied. In some implementations, the condition may be satisfied when the wearable device is at least one of (i) situated within a predetermined distance from the electronic device and (ii) situated at a predetermined position relative to the electronic device. Additionally or alternatively, the condition may be satisfied when the gaze of a user wearing the electronic device is detectable by the electronic device. The change of orientation may be relative to the Earth's gravity field, and/or any other suitable type of orientation change. The change of orientation may be detected using a gyro sensor, an acceleration sensor, and/or any other suitable type of sensor.

Figure 18:
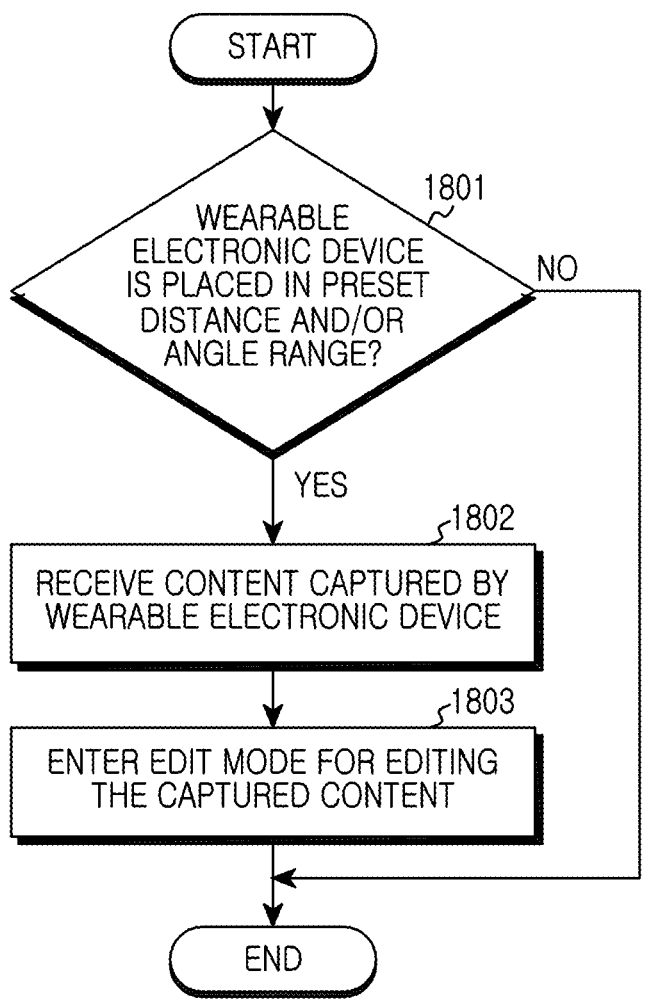
FIG. 18 is a flowchart of an example of a process, according to aspects of the disclosure.

In step 1702, content currently displayed on the electronic device is transmitted to the wearable device FIG. 18 is a flowchart of an example of a process, according to aspects of the disclosure. In step 1801, the electronic device can determine whether the wearable electronic device is placed within a preset distance and/or angle range from the electronic device. In step 1802, the electronic device can receive content that is captured by the wearable electronic device. The content may include any suitable type of content, such as a still image, a video, etc. At stop 1803, the electronic device transitions to a mode for editing the captured content in step 1803. For example, upon receiving the captured content, the electronic device can switch to the image edit mode for editing the image. As another example, upon receiving a video clip from the wearable electronic device, the electronic device can switch to the video edit mode for editing the video. Upon exiting the edit mode, the electronic device may return to a state the electronic device was in prior to entering the editing mode. For example, the electronic device may resume a music playback that was taking place when the content captured by the wearable electronic device is received.

Figure 19:
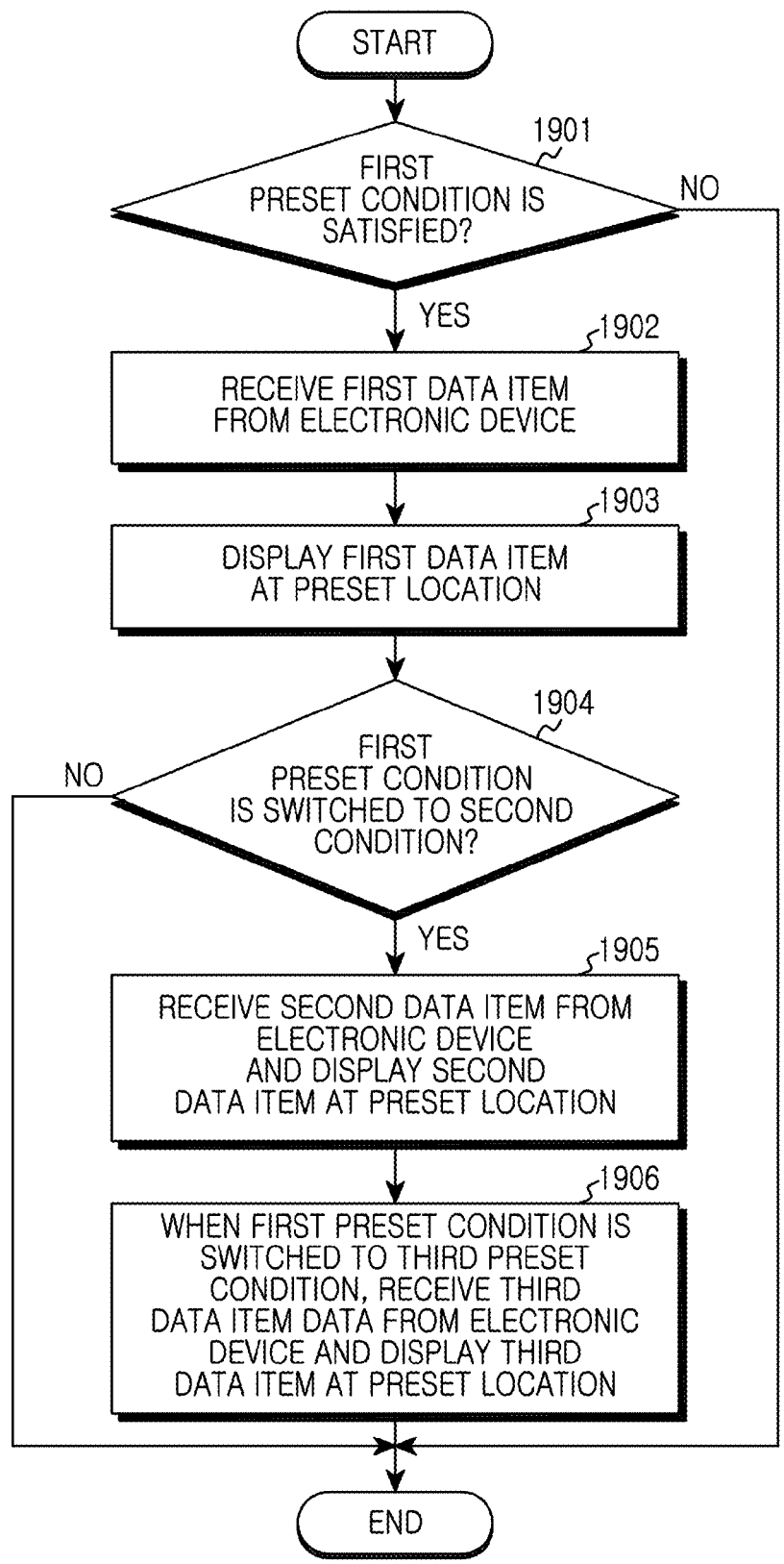
FIG. 19 is a flowchart of an example of a process, according to aspects of the disclosure.

FIG. 19 is a flowchart of an example of a process, according to aspects of the disclosure. In step 1901, the wearable electronic device can determine whether a first preset condition is satisfied. For example, the wearable electronic device can determine whether it is placed within a first preset distance and/or a first angle range from the electronic device. In step 1902, when the first preset condition is satisfied, the wearable electronic device can receive first data item from the electronic device. For example, the first data item can be unrelated to content that is currently displayed by the electronic device. For example, the first data item may include an incoming text message. In step 1903, the wearable electronic device can display the first data item. In step 1904, the wearable electronic device can determine whether a second condition is satisfied. For example, the second condition may be satisfied when the wearable electronic device is placed within a second preset distance and/or a second angle range from the electronic device. For example, when the first preset distance is 3 feet from the electronic device, the second preset distance may be 5 feet from the electronic device. The second preset distance may be further from the electronic device than the first preset distance. And the second angle range may be when the wearable electronic device exits the first angle range relative to the electronic device.

In step 1905, in response to the second condition being satisfied, the wearable electronic device can receive a second data item from the electronic device and display the second data item at the preset location. For example, the second data item can include text message or other information that is unrelated to content that is currently displayed on the electronic device.

In step 1906, when the first preset condition is switched to a third preset condition, the wearable electronic device can receive a third data item from the electronic device and display the third data item at the preset location. For example, the third preset condition may be satisfied when the wearable electronic device is placed within a third preset distance and/or a third angle range from the electronic device. For example, when the first preset distance is 3 feet from the electronic device and the second preset distance may be 5 feet from the electronic device, the third preset distance may be 10 feet from the electronic device. The third preset distance may be further from the electronic device than the first and second preset distances. And the third angle range may be when the wearable electronic device exits the second angle range relative to the electronic device. The third data item can include content captured at the same place as the content displayed by the electronic device.

Figure 20:
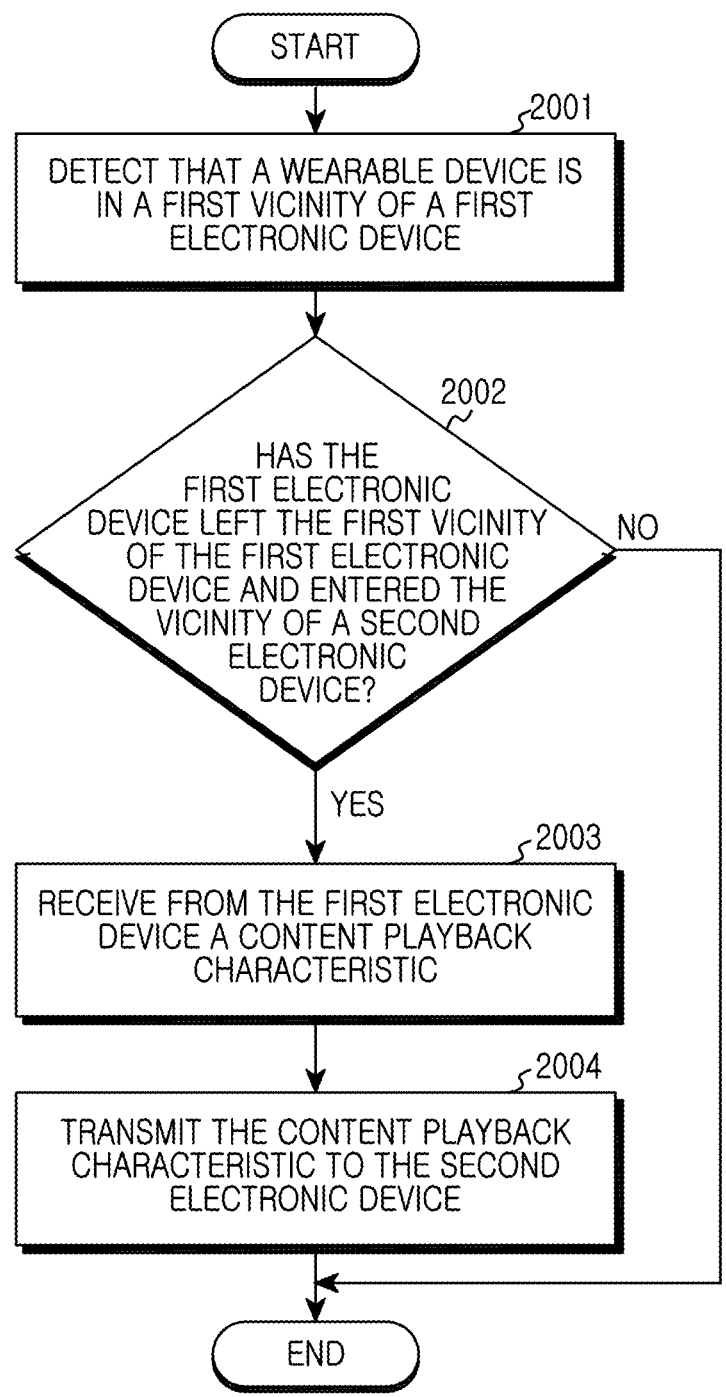
FIG. 20 is a flowchart of an example of a process, according to aspects of the disclosure.

FIG. 20 is a flowchart of an example of a process, according to aspects of the disclosure. As step 2001, the wearable electronic device can detect that it is located within a first vicinity of a first electronic device. For example, the wearable electronic device can receive from the electronic device, an indication that the wearable electronic device is at least one of: (i) within the preset distance from the electronic device and (ii) within a first preset range of the first electronic device.

In step 2002, the wearable electronic device can determine whether it has left the first vicinity and entered a second vicinity of a second electronic device. For example, the wearable electronic device may detect that it has exited the first vicinity by receiving an indication to that effect from the first electronic device. Additionally or alternatively, as another example, the wearable electronic device can detect that it has moved into the second vicinity based on receiving an indication from the second electronic device that the wearable electronic device is (i) located within a preset distance from the second electronic device and/or (ii) located within a second preset range of the second electronic device.

In step 2003, the wearable electronic device receives a characteristic of a content playback performed on the first electronic device. The content playback characteristic can include at least one of title of the content, a location from where the content can be retrieved, and an indication of a point in the content where the content playback is paused.

In step 2004, the wearable electronic device can send the received content playback characteristic to the second electronic device.

Figure 21:
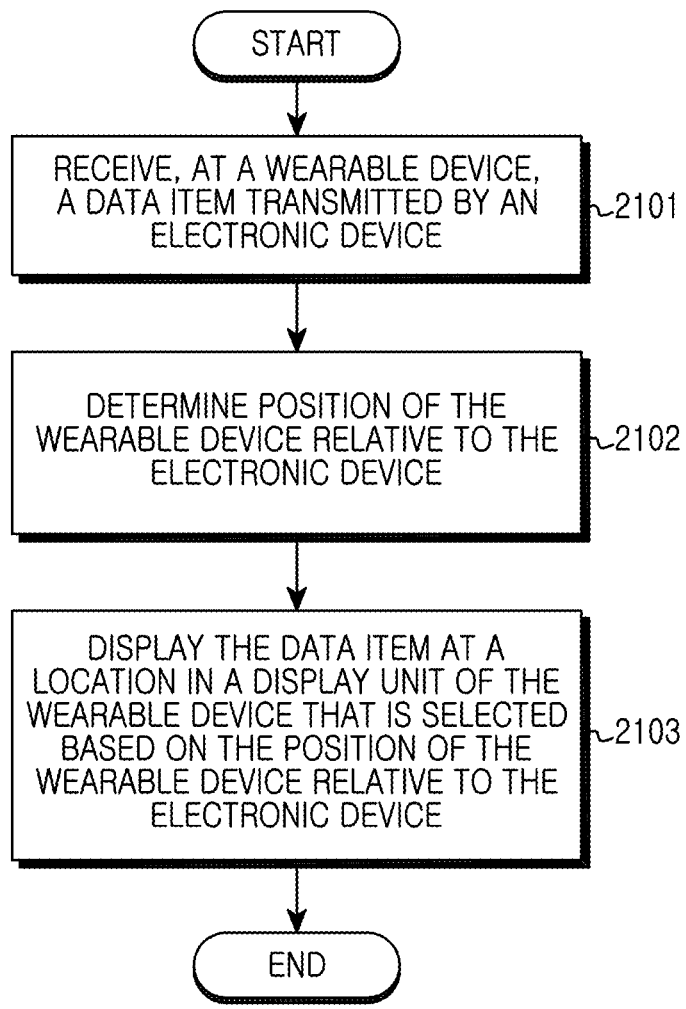
FIG. 21 is a flowchart of an example of a process, according to aspects of the disclosure.

FIG. 21 is a flowchart of an example of a process, according to aspects of the disclosure. In step 2101, a wearable electronic device can receive a data item transmitted by an electronic device. For example, when the electronic device plays the video content, the data item can include subtitles for the video content.

In step 2102, the wearable electronic device can determine the position of the wearable electronic device relative to the electronic device. More specifically, the wearable electronic device can determine its location in one of the upper left region, the lower left region, the lower right region, and the upper right region based on the center of the electronic device.

In step 2103, the wearable electronic device can display the data item at a location in a display unit of the wearable electronic device that is selected based on the position of the wearable electronic device relative to the electronic device. For example, as illustrated in FIG. 11, when the wearable electronic device is situated to the left of a midline of the electronic device, the data item may be displayed at a first location. By contrast, when the wearable electronic device is situated to the right of the midline of the electronic device, the data item can be displayed at a second location.

Figure 22:
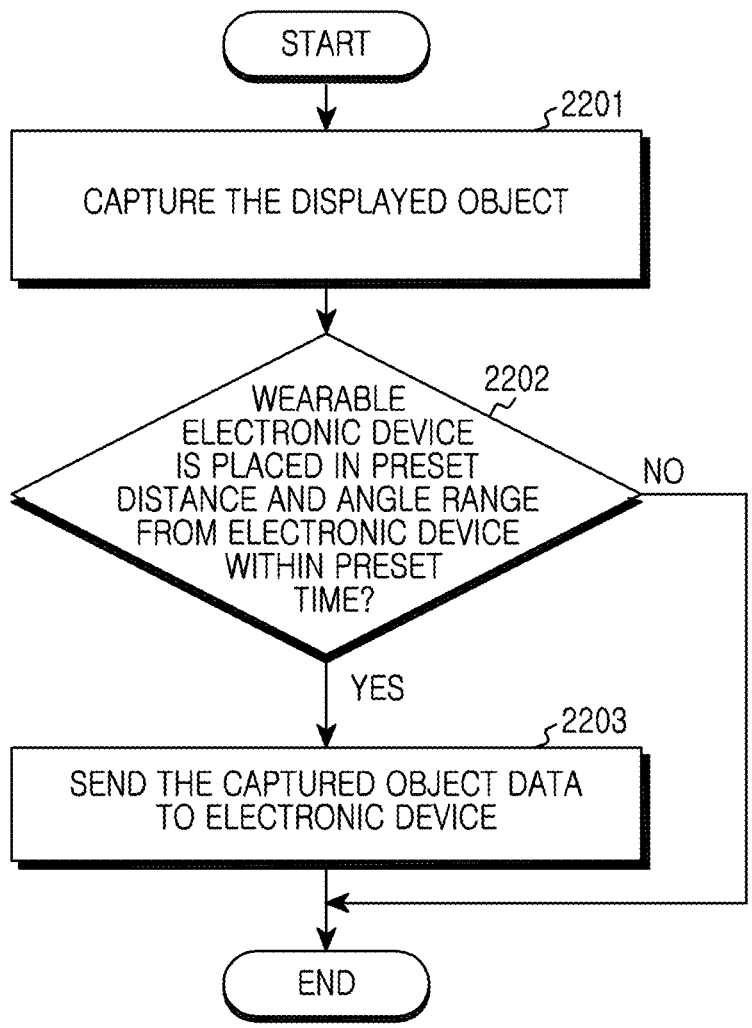
FIG. 22 is a flowchart of an example of a process, according to aspects of the disclosure.

FIG. 22 is a flowchart of an example of a process, according to aspects of the disclosure. In step 2201, the wearable electronic device can capture the displayed object in step 2201. In more detail, the wearable electronic device can capture the currently displayed object by receiving the command for capturing the displayed object. For example, the wearable electronic device can capture the image or the consecutive video image of the currently displayed object.

In step 2202, the wearable electronic device can determine whether it is placed in the preset distance and angle range within the preset time. More specifically, the wearable electronic device can determine whether the data indicating the location in the preset distance and angle range within the preset time, is received from the electronic device.

In the preset distance and angle range with the electronic device within the preset time in step 2202, the wearable electronic device can send the captured object data to the electronic device in step 2203. For example, when capturing the image, the wearable electronic device can send the captured image data to the electronic device. For example, when capturing the video, the wearable electronic device can send the captured video data to the electronic device.

Figure 23:
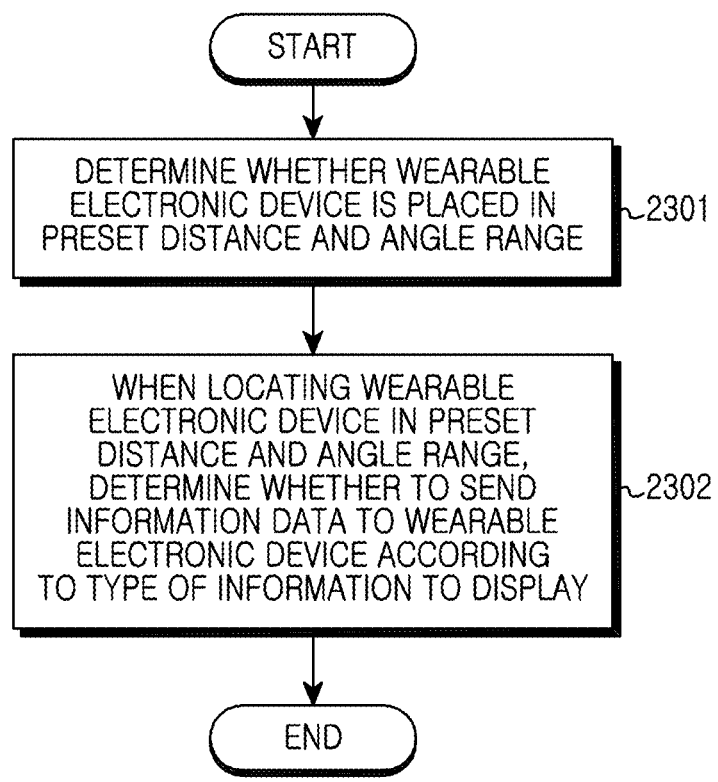
FIG. 23 illustrates operations of the electronic device for varying the displayed information location by detecting the user's gaze wearing the wearable electronic device according to an exemplary embodiment of the present disclosure.

FIG. 23 is a flowchart of operations of the electronic device for varying the displayed information location by detecting the user's gaze wearing the wearable electronic device according to an exemplary embodiment of the present disclosure. As shown in FIG. 23, the electronic device can determine whether the wearable electronic device is placed within the preset distance and angle range in step 2301. More specifically, the electronic device can determine using its camera whether the user's eyeballs with the wearable electronic device put on is placed in the preset distance and preset angle range.

When the wearable electronic device is placed in the preset distance and angle range, the electronic device can determine whether to send the information data to the wearable electronic device according to the type of the information to display in step 2302. In more detail, according to the type of the information to display being the additional information relating to the current content or the independent information, the electronic device can determine whether to send the information data to the wearable electronic device.

Figure 24:
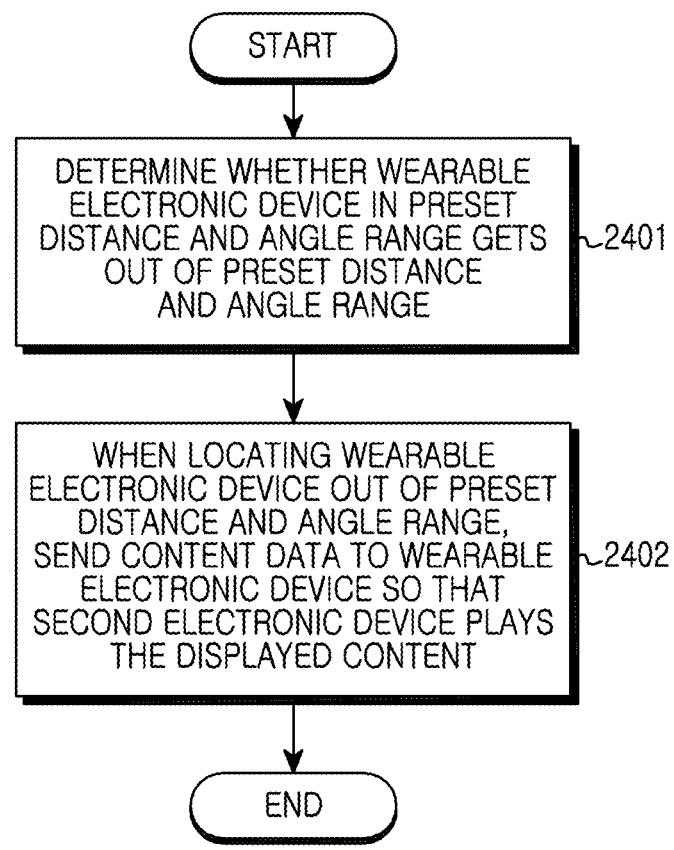
FIG. 24 illustrates operations of the first electronic device for playing the content according to the user's gaze according to an exemplary embodiment of the present disclosure.

FIG. 24 is a flowchart of operations of the first electronic device for playing the content according to the user's gaze according to an exemplary embodiment of the present disclosure. As shown in FIG. 24, the first electronic device can determine whether the wearable electronic device in the preset distance and angle range gets out of the preset distance and angle range in step 2401. That is, the first electronic device can send to the wearable electronic device the additional information data of the tag information and the subtitle information of the video content, and then determine whether the wearable electronic device in the preset distance and angle range gets out of the preset distance and angle range.

When locating the wearable electronic device outside the preset distance and angle range, the first electronic device can send the content data to the wearable electronic device so that the second electronic device can play the displayed content in step 2402. More specifically, when the wearable electronic device gets out of the preset distance and preset angle range, the first electronic device can send the data of the content displayed on the touch screen, to the wearable electronic device. Herein, the content data can include at least one of the content title, the storage location, and the pause point. Next, when confirming the pause of the displayed content and then determining the elapse of the preset time, the first electronic device can confirm the end of the paused content play. That is, when the user's gaze leaves the first electronic device, the first electronic device can stop the play of the paused content.

Figure 25:
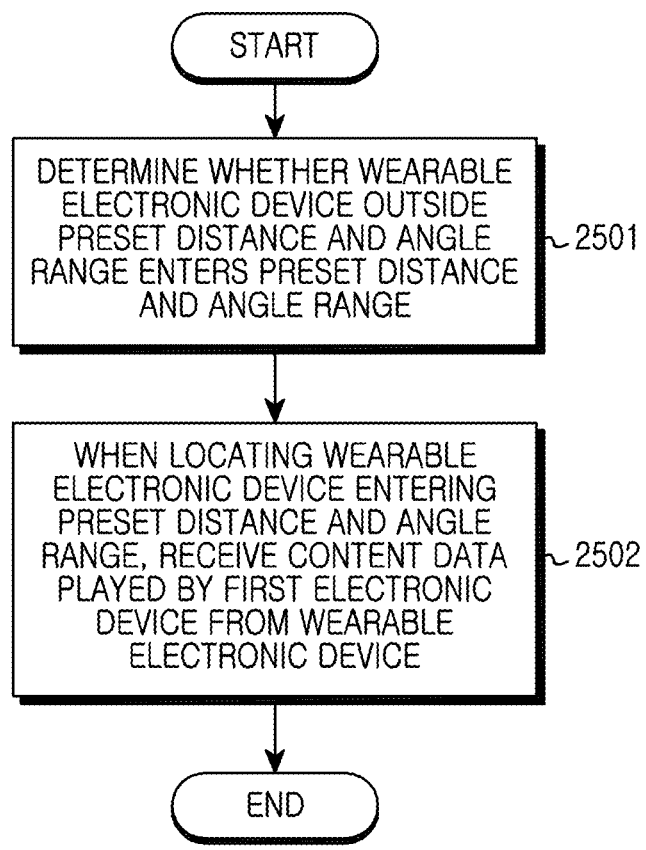
FIG. 25 illustrates operations of the second electronic device for playing the content according to the user's gaze according to an exemplary embodiment of the present disclosure.

FIG. 25 is a flowchart of operations of the second electronic device for playing the content according to the user's gaze according to an exemplary embodiment of the present disclosure. As shown in FIG. 25, the second electronic device can determine whether the wearable electronic device outside the preset distance and angle range enters the preset distance and angle range in step 2501. In more detail, the second electronic device can determine whether the wearable electronic device in the preset distance and angle range of the first electronic device enters the preset distance and angle range of the second electronic device.

When locating the wearable electronic device entering the preset distance and angle range, the second electronic device can receive the content data played by the first electronic device from the wearable electronic device in step 2502. That is, the second electronic device can receive the data including the title, the storage location, and the pause point of the content played by the first electronic device from the wearable electronic device. Next, the second electronic device can continue the content play from the pause point of the first electronic device, based on the received content data. More specifically, the second electronic device can continue the video content from the point when the first electronic device does not detect the user's gaze.

Figure 26:
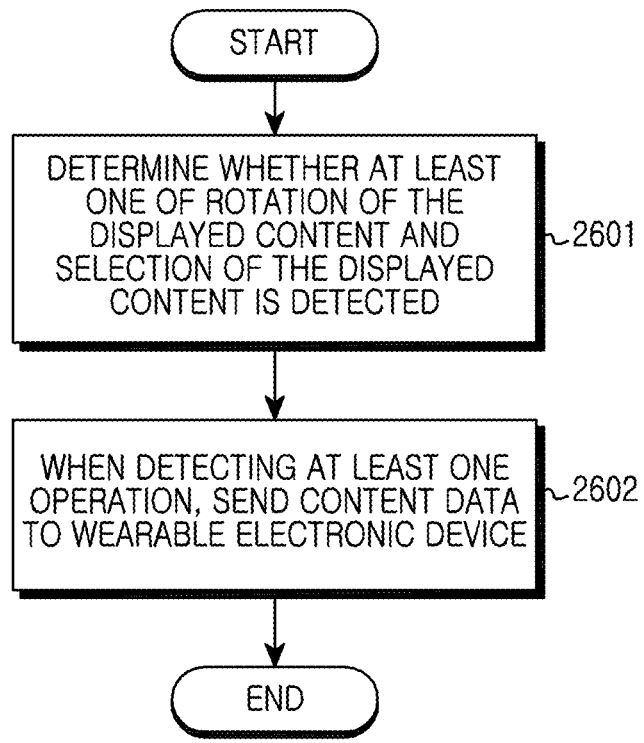
FIG. 26 illustrates operations of the electronic device for sending the file to the wearable electronic device according to an exemplary embodiment of the present disclosure.

FIG. 26 is a flowchart of operations of the electronic device for sending the file to the wearable electronic device according to an exemplary embodiment of the present disclosure. As shown in FIG. 26, the electronic device can determine whether at least one of the rotation of the displayed content and the selection of the displayed content is detected in step 2601. Herein, the electronic device can determine whether the content displayed on the touch screen is rotated, using the sensor for detecting its location change such as gyro sensor and acceleration sensor. The electronic device can determine whether one of the displayed images is selected by the user's touch input using the hovering function.

When detecting at least one of the rotation of the displayed content and the selection of the displayed content, the electronic device can send the rotated content or the selected content to the wearable electronic device in step 2602. That is, when detecting the different gaze from the user's initial gaze, the electronic device, which is configured to send the current content to the wearable electronic device, can send the displayed content to the wearable electronic device. When one of the multiple contents displayed on the touch screen is selected, the electronic device can send the selected content to the wearable electronic device so as to display the selected image in the wearable electronic device.

Figure 27:
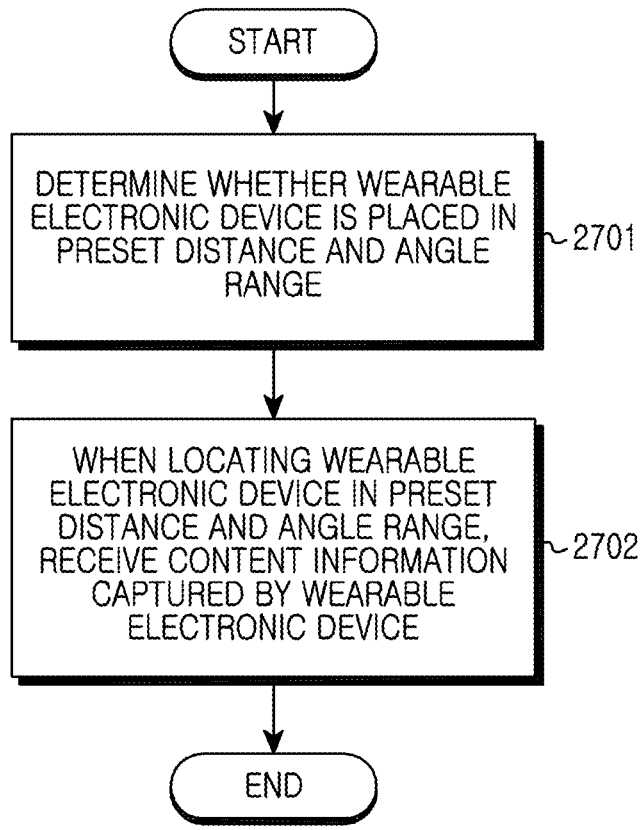
FIG. 27 illustrates operations of the electronic device for receiving the content from the wearable electronic device and entering the edit mode according to an exemplary embodiment of the present disclosure.

FIG. 27 is a flowchart of operations of the electronic device for receiving the content from the wearable electronic device and entering the edit mode according to an exemplary embodiment of the present disclosure. As shown in FIG. 27, the electronic device can determine whether the wearable electronic device is placed within the preset distance and angle range in step 2701. More specifically, the electronic device can determine using its camera whether the user's eyeballs with the wearable electronic device put on is placed in the preset distance and preset angle range.

When locating the wearable electronic device in the preset distance and angle range, the electronic device can receive the content information captured by the wearable electronic device in step 2702. For example, when the wearable electronic device captures the image, the electronic device can receive the captured image information from the wearable electronic device. For example, when the wearable electronic device captures the video, the electronic device can receive the captured video information from the wearable electronic device. Next, the electronic device can switch to the edit mode for editing the captured content. For example, when receiving the image content from the wearable electronic device, the electronic device can switch to the image edit mode for editing the image. For example, when receiving the video content from the wearable electronic device, the electronic device can switch to the video edit mode for editing the video.

Figure 28:
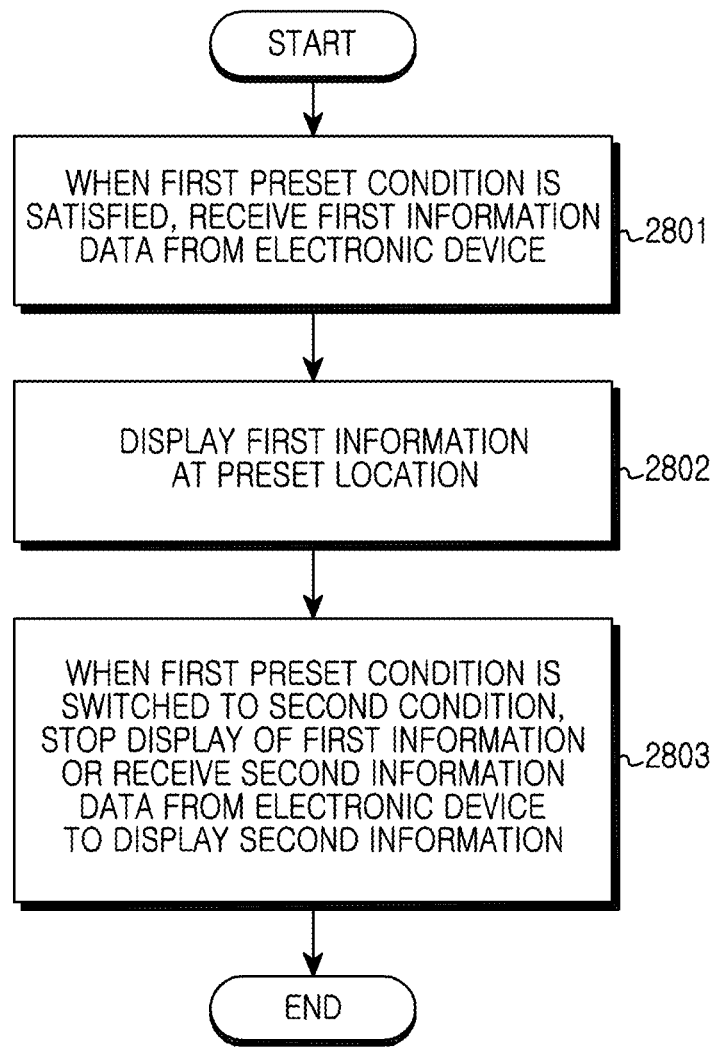
FIG. 28 illustrates operations of the wearable electronic device for displaying the information by detecting the user's gaze according to an exemplary embodiment of the present disclosure.

FIG. 28 is a flowchart of operations of the wearable electronic device for displaying the information by detecting the user's gaze according to an exemplary embodiment of the present disclosure. As shown in FIG. 28, when the first preset condition is satisfied, the wearable electronic device can receive the first information data from the electronic device in step 2801. Herein, the first preset condition can indicate the location within the preset distance and angle range from the electronic device.

In step 2802, the wearable electronic device can display the first information at the preset location. Herein, the first information can be the independent information irrelevant to the current content displayed by the electronic device. For example, the wearable electronic device can display the independent information irrelevant to the current content displayed by the electronic device, such as text message, at the preset location.

When the first preset condition is switched to the second preset condition, the wearable electronic device can stop the display of the first information or receive the second information data from the electronic device to display the second information in step 2803. Herein, the second preset condition can indicate the location outside the preset distance and angle range from the electronic device. The second information can be the additional information including at least one of the tag information, the lyric information, the broadcasting channel information, and the character information of the current content displayed by the electronic device.

Figure 29:
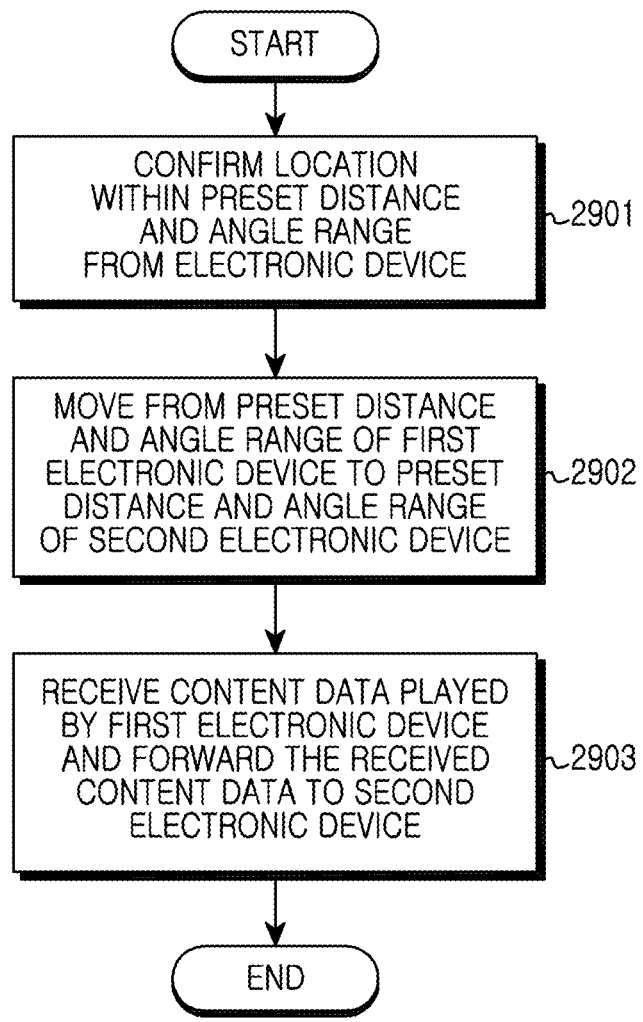
FIG. 29 illustrates operations of the wearable electronic device for sending the content between the linked electronic devices according to an exemplary embodiment of the present disclosure.

FIG. 29 is a flowchart of operations of the wearable electronic device for sending the content between the linked electronic devices according to an exemplary embodiment of the present disclosure. As shown in FIG. 29, the wearable electronic device can confirm its location in the preset distance and angle range from the electronic device in step 2901. For example, the wearable electronic device can receive the data indicating the wearable electronic device and the first electronic device inside the preset distance and angle range, from the first electronic device.

In step 2902, the wearable electronic device can confirm that it moves from the preset distance and angle range of the first electronic device to the preset distance and angle range of the second electronic device. More specifically, the wearable electronic device can receive data indicating the outside of the preset distance and angle range from the first electronic device, and then receive data indicating the inside of the preset distance and angle range from the second electronic device.

In step 2903, the wearable electronic device can receive the content data played by the first electronic device and forward the received content data to the second electronic device. Herein, the content data can include at least one of the content title, the storage location, and the pause point.

Figure 30:
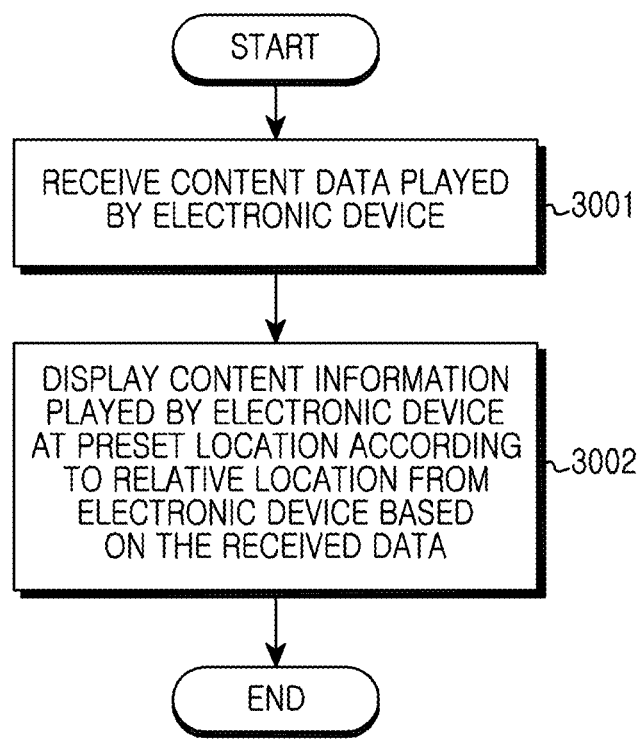
FIG. 30 illustrates operations of the wearable electronic device for changing the displayed information location according to the location of the electronic device according to an exemplary embodiment of the present disclosure.

FIG. 30 is a flowchart of operations of the wearable electronic device for changing the displayed information location according to the location of the electronic device according to an exemplary embodiment of the present disclosure. As shown in FIG. 30, the wearable electronic device can receive the content data played by the electronic device in step 3001. For example, when the electronic device plays the video content, the wearable electronic device can receive the additional information data including the subtitle information of the played video content from the electronic device.

In step 3002, the wearable electronic device can display the content information played by the electronic device at the preset location according to the relative location from the electronic device based on the received data. For example, in the upper region, the wearable electronic device can display the subtitle information of the video content played by the electronic device, at the top. For example, in the lower region, the wearable electronic device can display the subtitle information of the video content played by the electronic device, at the bottom. For example, in the left region, the wearable electronic device can display the subtitle information of the video content played by the electronic device, on the left. For example, in the right region, the wearable electronic device can display the subtitle information of the video content played by the electronic device, on the right.

Figure 31:
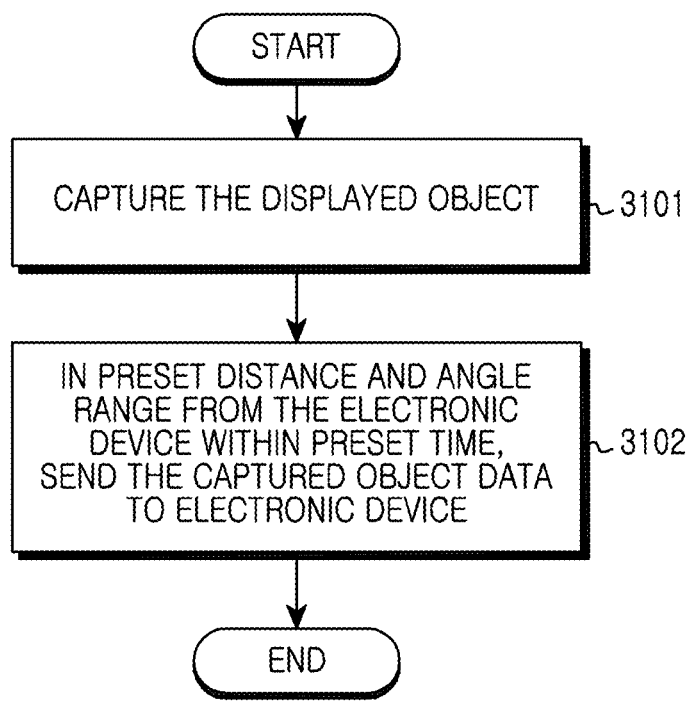
FIG. 31 illustrates operations of the wearable electronic device for sending the captured content to the electronic device according to an exemplary embodiment of the present disclosure.

FIG. 31 is a flowchart of the wearable electronic device for sending the captured content to the electronic device according to an exemplary embodiment of the present disclosure. As shown in FIG. 31, the wearable electronic device can capture the displayed object in step 3101. In more detail, the wearable electronic device can capture the currently displayed object by receiving the command for capturing the displayed object. For example, the wearable electronic device can capture the image or the consecutive video images of the currently displayed object.

In the preset distance and angle range with the electronic device within the preset time, the wearable electronic device can send the captured object data to the electronic device in step 3102. For example, when capturing the image, the wearable electronic device can send the captured image data to the electronic device. For example, when capturing the video, the wearable electronic device can send the captured video data to the electronic device.

FIGS. 1-31 are provided as an example only. At least some of the steps discussed with respect to these figures can be performed concurrently, performed in a different order, and/or altogether omitted. It will be understood that the provision of the examples described herein, as well as clauses phrased as "such as," e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method in an electronic device, the method comprising:
    establishing a communication with a wearable device;
    determining whether the wearable device is within a distance and a position relative to the electronic device;
    determining whether a first data item corresponds to content currently displayed on the electronic device;
    in response to determining that the wearable device is within the distance and the position relative to the electronic device and that the first data item corresponds to content currently displayed on the electronic device, transmitting the first data item from the electronic device to the wearable device; and
    in response to determining that the wearable device is within the distance and the position relative to the electronic device and that the first data item does not correspond to content currently displayed on the electronic device, displaying the first data item on the electronic device,
    wherein upon detecting that the position of the wearable device is changed relative to the electronic device, transmitting a second data item from the electronic device to the wearable device for changing the first item displayed on the wearable device into the second item.

2. The method of claim 1, wherein the wearable device includes a head-mounted display.

3. The method of claim 1, further comprising when the wearable device is not within the distance and the position relative to the electronic device, transmitting the first data item to the wearable device based on the wearable device being at least one of (i) located further than a threshold distance from the electronic device or (ii) located outside of a predetermined region.

4. The method of claim 1, wherein when the first data item corresponds to the content, the first data item is transmitted to the wearable device based on the wearable device being at least one of (i) located within a threshold distance from the electronic device or (ii) located within a predetermined region.

5. The method of claim 1, wherein the first data item includes content that is currently displayed on the electronic device, and the first data item is transmitted to the wearable device in response to at least one of (i) the electronic device moving further than a predetermined distance from the electronic device and (ii) the position of the wearable device changing relative to the electronic device.

6. The method of claim 1, wherein the first data item includes an indication of a state of a content playback that is currently performed by the electronic device, and the first data item is transmitted to the wearable device in response to at least one of (i) the electronic device moving further than a predetermined distance from the electronic device and (ii) the position of the wearable device changing relative to the electronic device.

7. The method of claim 1, further comprising:
  receiving, from the wearable device, an indication of a content playback state; and
  initiating a playback of the content based on the indication.

8. The method of claim 1, further comprising changing an orientation of a screen displayed by the electronic device based on the position of the wearable device relative to the electronic device.

9. An electronic device comprising a processor configured to:
  establish a communication with a wearable device;
  determine whether the wearable device is within a distance and a position relative to the electronic device;
  determine whether a first data item corresponds to content currently displayed on the electronic device;
  in response to the determination that the wearable device is within the distance and the position relative to the electronic device and that the first data item corresponds to content currently displayed on the electronic device, transmit the first data item from the electronic device to the wearable device; and
  in response to the determination that the wearable device is within the distance and the position relative to the electronic device and that the first data item does not correspond to content currently displayed on the electronic device, display the first data item on the electronic device,
  wherein upon detecting that the position of the wearable device is changed relative to the electronic device, transmit a second data item from the electronic device to the wearable device for changing the first item displayed on the wearable device into the second item.

10. The electronic device of claim 9, wherein the wearable device includes a head-mounted display.

11. The electronic device of claim 9, wherein the processor is further configured to,
  when the wearable device is not within the distance and the position relative to the electronic device, transmit the first data item to the wearable device based on the wearable device being at least one of (i) located further than a threshold distance from the electronic device or (ii) located outside of a predetermined region.

12. The electronic device of claim 9, wherein when the first data item corresponds to the content, the first data item is transmitted to the wearable device based on the wearable device being at least one of (i) located within a threshold distance from the electronic device or (ii) located within a predetermined region.

13. The electronic device of claim 9, wherein the first data item includes content that is currently displayed on the electronic device, and the first data item is transmitted to the wearable device in response to at least one of (i) the electronic device moving further than a predetermined distance from the electronic device and (ii) the position of the wearable device changing relative to the electronic device.

14. The electronic device of claim 9, wherein the first data item includes an indication of a state of a content playback that is currently performed by the electronic device, and the first data item is transmitted to the wearable device in response to at least one of (i) the electronic device moving further than a predetermined distance from the electronic device and (ii) the position of the wearable device changing relative to the electronic device.

15. The electronic device of claim 9, wherein the processor is further configured to:
  receive, from the wearable device, an indication of a content playback state; and
  initiate a playback of the content based on the indication.

16. The electronic device of claim 9, wherein the processor is further configured to change an orientation of a screen displayed by the electronic device based on the position of the wearable device relative to the electronic device.

* * * * *